United States Patent
Yamaguchi et al.

(10) Patent No.: US 9,783,136 B2
(45) Date of Patent: Oct. 10, 2017

(54) WIRE HARNESS

(71) Applicants: YAZAKI CORPORATION, Tokyo (JP); TOYOTA JIDOSHA KABUSHIKI KAISHA, Toyota-shi, Aichi-ken (JP)

(72) Inventors: Yasuhiro Yamaguchi, Shizuoka (JP); Yoshitaka Ohkubo, Shizuoka (JP); Hajime Kato, Shizuoka (JP); Yasuhiro Otsuta, Shizuoka (JP); Takeshi Innan, Shizuoka (JP); Hiroshi Aihara, Toyota (JP)

(73) Assignees: YAZAKI CORPORATION, Minato-ku, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/150,683

(22) Filed: May 10, 2016

(65) Prior Publication Data

US 2016/0362074 A1    Dec. 15, 2016

(30) Foreign Application Priority Data

Jun. 12, 2015 (JP) .................. 2015-119639

(51) Int. Cl.
| | | |
|---|---|---|
| *B60R 16/02* | (2006.01) | |
| *H01B 9/00* | (2006.01) | |
| *H01R 9/15* | (2006.01) | |
| *H01B 9/02* | (2006.01) | |
| *H02H 9/06* | (2006.01) | |

(52) U.S. Cl.
CPC ......... *B60R 16/0215* (2013.01); *H01B 9/006* (2013.01); *H01B 9/028* (2013.01); *H01R 9/15* (2013.01); *H02H 9/06* (2013.01)

(58) Field of Classification Search
CPC .... B50R 16/0215; H01B 9/028; H01B 9/006; H01R 9/15
USPC .......................................... 174/72 A
See application file for complete search history.

(56) References Cited

U.S. PATENT DOCUMENTS 4,538,200 A * 8/1985 Shaikh ............... H01C 7/12
                                                 310/68 R
2005/0133245 A1   6/2005 Katsuyama et al.

FOREIGN PATENT DOCUMENTS

| JP | 05166566 | * | 7/1993 |
| JP | 9-199237 A | | 7/1997 |
| JP | 2004-31291 A | | 1/2004 |
| JP | 2004-343832 A | | 12/2004 |

(Continued)

OTHER PUBLICATIONS

Communication dated Jul. 25, 2017, issued by the Japanese Patent Office in counterpart application No. 2015-119639.

*Primary Examiner* — Timothy Thompson
*Assistant Examiner* — Charles Pizzuto
(74) *Attorney, Agent, or Firm* — Sughrue Mion, PLLC

(57) ABSTRACT

A wire harness includes a wire portion having three wires arranged in the same direction, connectors connected to both end portions of the wire portion, a middle portion installed in an intermediate position of the wire portion between the connectors, a wire-side surge reducing section provided in the wire portion, a connector-side surge reducing section provided in each of the connectors, and a middle portion-side surge reducing section provided in the middle portion.

19 Claims, 15 Drawing Sheets

(56) References Cited

FOREIGN PATENT DOCUMENTS

| JP | 2013-191409 A | 9/2013 |
| JP | 2014-138130 A | 7/2014 |

\* cited by examiner

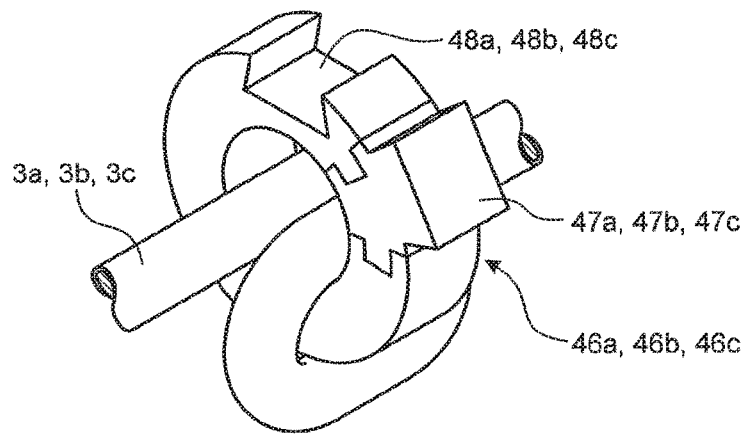
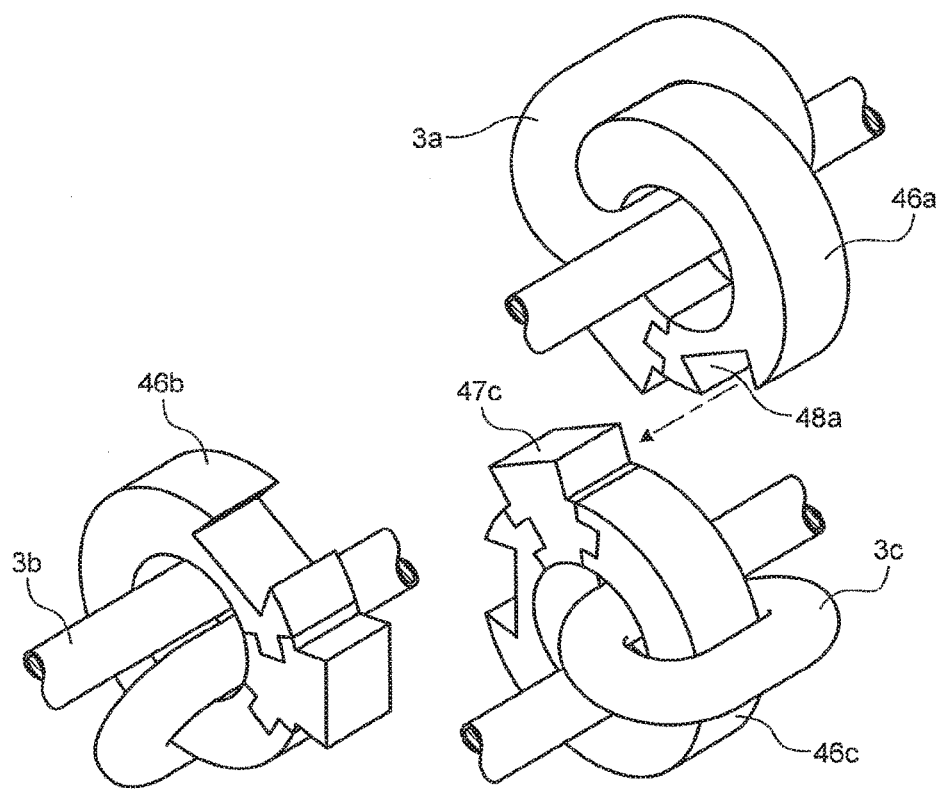

WIRE HARNESS

CROSS-REFERENCE TO RELATED APPLICATION(S)

The present application claims priority to and incorporates by reference the entire contents of Japanese Patent Application No. 2015-119639 filed in Japan on Jun. 12, 2015.

BACKGROUND OF THE INVENTION

1. Field of the Invention

The present invention relates to a wire harness.

2. Description of the Related Art

In a conventional vehicle such as a hybrid vehicle and an electric vehicle, an inverter and a motor have been connected to each other through a three-phase wire, and power has been supplied from the inverter to the motor. When power is supplied from the inverter to the motor, an excessive surge voltage may be generated inside a wire harness that connects the inverter and the motor and input to the motor due to a steeply rising voltage contained in an output from the inverter. A scheme of suppressing the surge voltage has been proposed. For example, Japanese Patent Application Laid-open No. 2004-343832 discloses a configuration in which a surge voltage suppression circuit is provided between an inverter and a motor.

Incidentally, a surge voltage is amplified by being repeatedly reflected or radiated inside a wire harness that connects an inverter and a motor due to an impedance mismatch between the inverter and the motor. Thus, as a whole length of the wire harness that connects the inverter and the motor increases, a surge voltage generation rate is prone to increase. When the surge voltage generation rate increases as described above, a conventional scheme of suppressing a surge voltage as disclosed in Japanese Patent Application Laid-open No. 2004-343832 may not obtain an effect of sufficiently reducing a surge.

SUMMARY OF THE INVENTION

The present invention has been conceived in view of the above description, and an object of the present invention is to provide a wire harness capable of suitably suppressing a surge voltage.

In order to achieve the above mentioned object, a wire harness according to one aspect of the present invention includes a wire portion having three or more wires arranged in the same direction; connectors connected to end portions of the wire portion; a wire-side surge reducing means provided in the wire portion to reduce a surge voltage; and a connector-side surge reducing means provided in each of the connectors to reduce the surge voltage.

According to another aspect of the present invention, in the wire harness, it is preferable to further include a middle portion installed in an intermediate position of the wire portion between the connectors; and a middle portion-side surge reducing means provided in the middle portion to reduce the surge voltage.

In order to achieve the above mentioned object, a wire harness according to still another aspect of the present invention includes a wire portion having three or more wires arranged in the same direction; connectors connected to end portions of the wire portion; and a middle portion installed in an intermediate position of the wire portion between the connectors, wherein the wire harness includes any one of: a group of a wire-side surge reducing means provided in the wire portion to reduce a surge voltage and a middle portion-side surge reducing means provided in the middle portion to reduce the surge voltage; and a group of a connector-side surge reducing means provided in each of the connectors to reduce the surge voltage and the middle portion-side surge reducing means.

According to still another aspect of the present invention, in the wire harness, it is preferable to further include a shield member collectively surrounding an outer circumferential side of the wire portion, wherein the wire-side surge reducing means includes a first wire holding member maintaining arrangement of the wires around a central axial line of the wire portion, each of the wires of the wire portion includes a conductor and an insulator coating an outer circumference of the conductor, and the first wire holding member includes: an external form maintaining portion surrounding a further outer circumferential side of the wire portion and the shield member; and a plurality of shield member form correcting portions formed such that each of the shield member form correcting portions projects from an inner circumferential surface of the external form maintaining portion in a direction of the central axial line between two wires of the wire portion adjacent to each other along a circumferential direction around the central axial line, and the shield member approaches a side of the central axial line from an outer circumferential-side tangent connecting the conductors of the two wires on a cross section viewed from an axial direction along the central axial line.

According to still another aspect of the present invention, in the wire harness, it is preferable that the wires of the wire portion have circular shapes on the cross section and are disposed at equal intervals along the circumferential direction, and the shield member form correcting portions of the first wire holding member are formed such that the shield member approaches the side of the central axial line from a segment connecting center of gravity points of two wires of the wire portion adjacent to each other in the circumferential direction between the two wires on the cross section.

According to still another aspect of the present invention, in the wire harness, it is preferable that the shield member form correcting portions of the first wire holding member are formed such that the shield member approaches up to the central axial line from between the two wires on the cross section to surround respective outer circumferential sides of the wires of the wire portion.

According to still another aspect of the present invention, in the wire harness, it is preferable that the shield member is grounded.

According to still another aspect of the present invention, in the wire harness, it is preferable that the wire-side surge reducing means includes a second wire holding member maintaining arrangement around the central axial line of the respective wires of the wire portion, and the second wire holding member includes: a main body portion formed in a cylindrical shape using the central axial line as an axial center; a plurality of wire housing portions provided to separately penetrate the main body portion along the central axial line, formed to be able to separately accommodate the wires, and disposed at equal intervals along the circumferential direction around the central axial line on the cross section viewed from the axial direction along the central axial line; and a space portion formed to penetrate the main body portion along the central axial line between two wire housing portions adjacent to each other along the circumferential direction among the plurality of wire housing portions.

According to still another aspect of the present invention, in the wire harness, it is preferable that the wire housing portions of the second wire holding member are formed such that a visible outline of the wires accommodated in the wire housing portions at least touches a visible outline of the cylindrical shape of the main body portion from an inner circumference side on the cross section.

According to still another aspect of the present invention, in the wire harness, it is preferable that the space portion of the second wire holding member is formed in an integrated manner from between two wire housing portions adjacent to each other along the circumferential direction among the plurality of wire housing portions up to the central axial line on the cross section.

According to still another aspect of the present invention, in the wire harness, it is preferable that the connector-side surge reducing means includes a magnetic material formed in an annular shape inside a case of each of the connectors accommodating the wire portion therein, and is installed to surround outer circumferential sides of the three or more wires of the wire portion or a plurality of conductors connected to the three or more wires, respectively.

According to still another aspect of the present invention, in the wire harness, it is preferable that the middle portion-side surge reducing means includes a magnetic material formed in an annular shape inside a casing of the middle portion accommodating the wire portion therein, and is installed to surround outer circumferential sides of the three or more wires of the wire portion or a plurality of conductors connected to the three or more wires, respectively.

According to still another aspect of the present invention, in the wire harness, it is preferable that the magnetic material is separately installed in each of the three or more wires or the plurality of conductors.

According to still another aspect of the present invention, in the wire harness, it is preferable that the magnetic material is installed to collectively surround outer circumferential sides in which the three or more wires or the plurality of conductors are arranged.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 21 is a perspective view illustrating a third step of the assembling process of the magnetic material according to the third modified example;

FIG. 22 is a perspective view illustrating a fourth step of the assembling process of the magnetic material according to the third modified example;

DETAILED DESCRIPTION OF THE PREFERRED EMBODIMENTS

Figure 1:
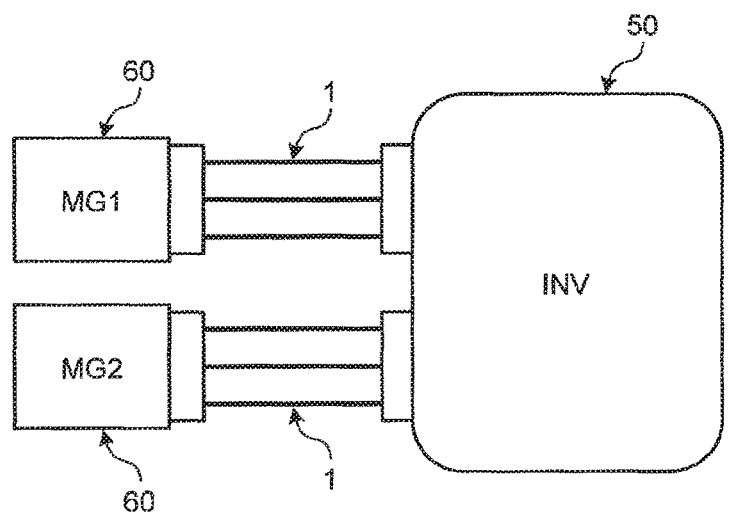
FIG. 1 is a schematic diagram illustrating a configuration for connecting a motor and an inverter by a wire harness according to an embodiment of the present invention.

Hereinafter, a description will be given of embodiments of a wire harness according to the present invention based on drawings. In the drawings below, the same reference numeral is applied to the same or corresponding portion, and a repeated description thereof will not be given.

Embodiment

Figure 2:
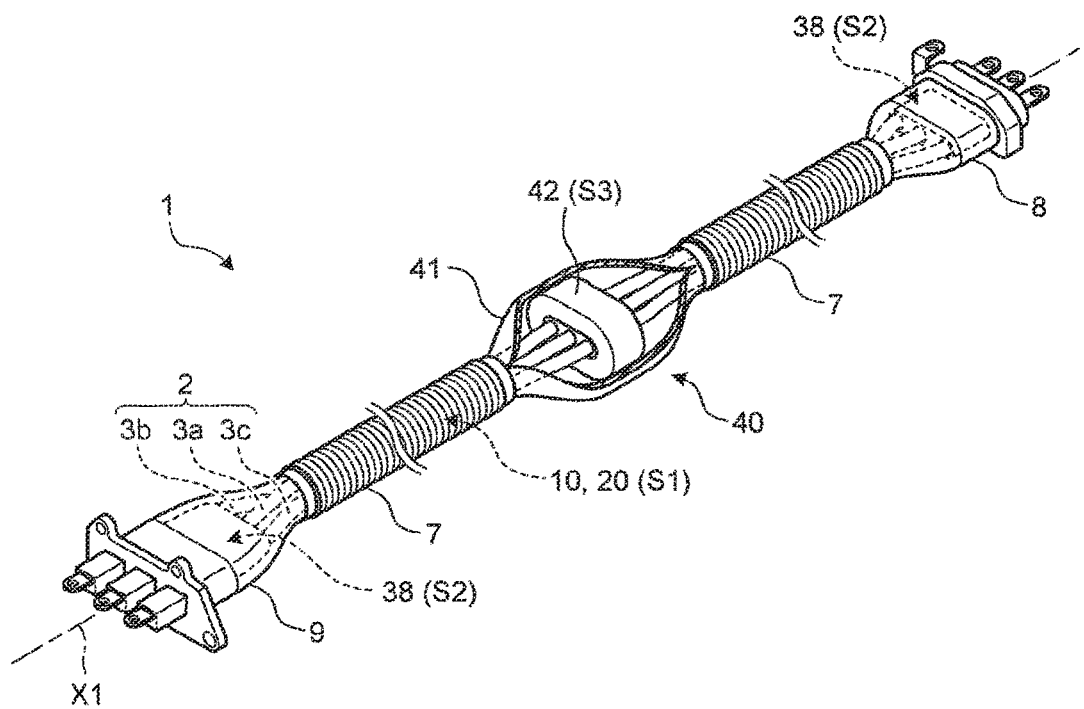
FIG. 2 is a perspective view of the wire harness according to an embodiment the present invention.
Figure 5:
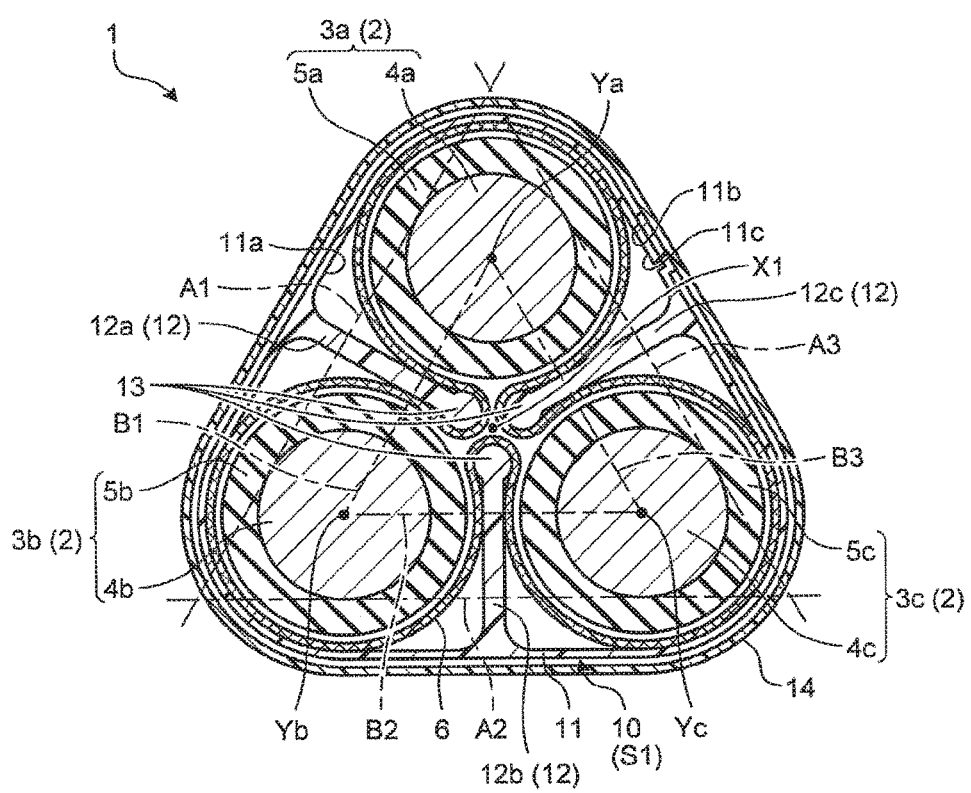
FIG. 5 is a cross-sectional view taken along V-V line of FIG. 4, is an axial sectional view of a portion including the first wire holding member of the wire harness according to an embodiment of the present invention, and is a diagram illustrating an example of a cross section perpendicular to the axial direction of the wire harness according to an embodiment of the present invention.

A description will be given of a schematic configuration of a wire harness 1 according to the present embodiment with reference to FIGS. 1, 2, and 5. FIG. 1 is a schematic diagram illustrating a configuration for connecting a motor and an inverter by a wire harness according to an embodiment of the present invention. FIG. 2 is a perspective view of the wire harness according to an embodiment of the present invention. FIG. 5 is a diagram illustrating an example of a cross section perpendicular to an axial direction of the wire harness according to an embodiment of the present invention.

An inverter 50 ("INV" of FIG. 1) and a motor 60 ("MG1" and "MG2" of FIG. 1) illustrated in FIG. 1 are installed in a vehicle such as a hybrid vehicle and an electric vehicle. The inverter 50 is a device for converting a direct current (DC) output from a power source (not illustrated) installed in the vehicle into a three-phase alternating current (AC) output. The inverter 50 may output a pulse width modulation (PWM) waveform, and may output a sine waveform. The motor 60 is a device driven by the three-phase AC output, which is output from the inverter 50. For example, the motor 60 is a three-phase motor having star connection.

The wire harness 1 according to the present embodiment is used as a power supply line that connects the inverter 50 and the motor 60 corresponding to the three-phase AC type. As illustrated in FIG. 2, the wire harness 1 is a three-phase wire including a three-phase and three-line type wire group that supplies three-phase AC power using three wires 3a, 3b, and 3c.

As illustrated in FIG. 2, referring to the wire harness 1, an inverter-side connector 8 (hereinafter simply referred to as a "connector 8") and a motor-side connector 9 (hereinafter simply referred to as a "connector 9") for connecting the inverter 50 and the motor 60, respectively, are connected to both terminals of a wire portion 2, in which the three wires 3a, 3b, and 3c are arranged in the same direction. In addition, as illustrated in FIG. 5, the wire harness 1 is configured by coating an outer circumferential side of the wire portion 2 with a tubular braided wire 6 (shield member) and a corrugated tube 7 (protective member). Further, the wire harness 1 according to the present embodiment includes a middle portion 40 at an intermediate position of the wire portion 2.

As illustrated in FIG. 5, the three wires 3a, 3b, and 3c of the wire portion 2 extend along a predetermined central axial line X1, and are disposed at equal intervals along a circumferential direction around the central axial line X1. The three respective wires 3a, 3b, and 3c correspond to unshielded wires and include conductors 4a, 4b, and 4c having circular shapes on a cross section and insulators 5a, 5b, and 5c formed by coating outer circumferences of the conductors 4a, 4b, and 4c. In other words, the wires 3a, 3b, and 3c have substantially circular shapes on a cross section (axial cross section, that is, cross section perpendicular to the central axial line X1) of the wire harness 1 when viewed from the axial direction along the central axial line X1 illustrated in FIG. 5. For example, the conductors 4a, 4b, and 4c of the wires 3a, 3b, and 3c include stranded wires formed by twisting a plurality of element wires made of metal (such as an aluminum alloy and a copper alloy) together in spiral shapes, rod-shaped single-core wires, and the like. For example, the insulators 5a, 5b, and 5c of the wires 3a, 3b, and 3c are formed by synthetic resin.

The respective wires 3a, 3b, and 3c of the wire portion 2 are disposed such that respective central axes (center of gravity points) Ya, Yb, and Yc thereof substantially form a regular triangle on the axial cross section illustrated in FIG. 5 to have a so-called trefoil-shaped disposition. In addition, the three wires 3a, 3b, and 3c are disposed such that two wires adjacent to each other in the circumferential direction around the central axial line X1 have a gap therebetween without touching each other by a first wire holding member 10 and a second wire holding member 20 to be described below. All the conductors 4a, 4b, and 4c and the insulators 5a, 5b, and 5c of the respective wires 3a, 3b, and 3c have plasticity, and thus the wire portion 2 can be bent and deformed.

The braided wire 6 is formed by weaving an element wire (metal thin wire) made of metal (for example, made of copper metal) in a mesh shape to have a tubular shape as a whole. The braided wire 6 functions as a shield member that suppresses noise by collectively surrounding the outer circumferential side of the wire portion 2. The braided wire 6 can be stretched due to plasticity of the element wire, and can be freely bent and deformed together with the wire portion 2.

The corrugated tube 7 is made of synthetic resin. For example, the corrugated tube 7 is formed in a shape of a cornice. In this way, the corrugated tube 7 can be freely elastically deformed, and may favorably maintain a cylindrical shape by an elastic restoring force. The corrugated tube 7 is formed such that the wire portion 2 and the braided wire 6 are accommodated inside the cylindrical shape. In this way, the outer circumferential side of the wire portion 2 can be coated to protect the wires.

The middle portion 40 is provided at an intermediate position in a direction in which the wire portion 2 extends. The middle portion 40 has a function of suppressing noise of the wire portion 2. For example, the middle portion 40 can be provided when a harness length (whole length) of the wire harness 1 is relatively long, and a generation rate of a surge voltage generated in the wire portion 2 is great. A configuration of the middle portion 40 will be described below.

Figure 29:
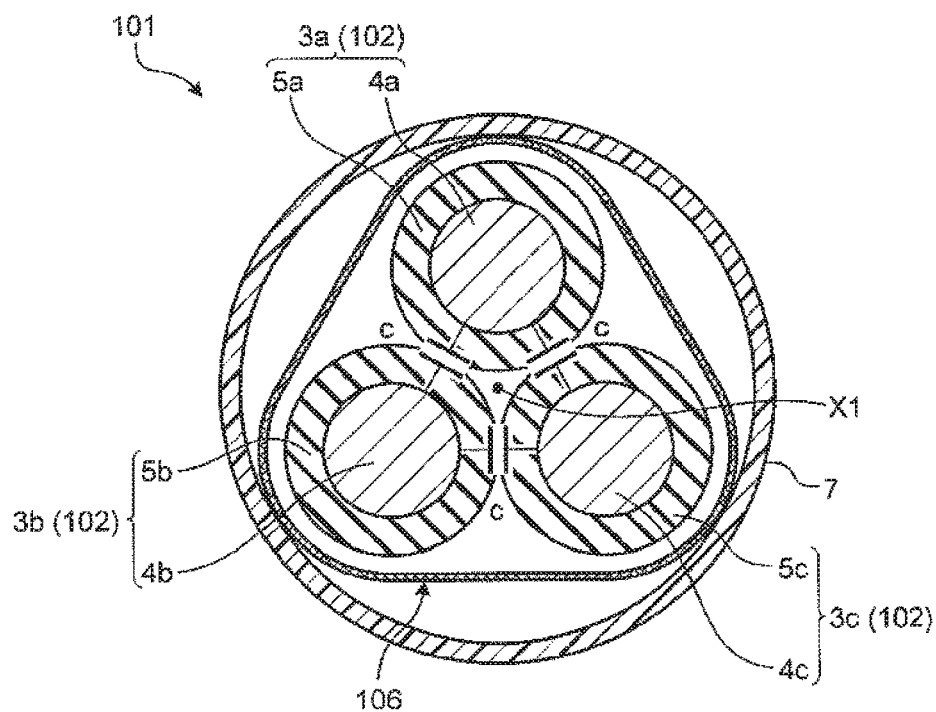
FIG. 29 is an axial sectional view of a conventional wire harness for explaining a collective shield structure of the wire harness.

Herein, a description will be given of a collective shield structure of a conventional wire harness 101 as a comparative example with reference to FIG. 29. FIG. 29 is an axial sectional view of the wire harness for explaining the collective shield structure of the conventional wire harness.

As illustrated in FIG. 29, the conventional wire harness 101 includes a wire portion 102, a braided wire 106, and the corrugated tube 7 similarly to the wire harness 1 of the present embodiment.

The wire portion 102 includes three wires 3a, 3b, and 3c similarly to the wire portion 2 of the wire harness 1 of the present embodiment. The wires 3a, 3b, and 3c are disposed in a shape of a trefoil on an axial cross section illustrated in FIG. 29. In addition, referring to the wires 3a, 3b, and 3c, two wires adjacent to each other in a circumferential direction around a central axial line X1 may touch each other. Materials, properties, and the like of the conductors 4a, 4b, and 4c and the insulators 5a, 5b, and 5c included in the wires 3a, 3b, and 3c are similar to those of the wire harness 1 of the present embodiment.

The braided wire 106 is formed in a tubular shape and to be similar in material and property to the braided wire 6 of the wire harness 1 of the present embodiment. In addition, the braided wire 106 collectively surrounds an outer circumferential side of the wire portion 102 similarly to the braided wire 6.

When the wire harness 101 is connected between the inverter 50 and the motor 60 to supply power (see FIG. 1), a steeply rising voltage (surge voltage) is contained in an output from the inverter 50 due to switching of the inverter 50. The surge voltage is high-frequency noise contained in the output of the inverter 50. The surge voltage is amplified by being repeatedly reflected or radiated many times between the inverter 50 and the motor 60 due to an impedance mismatch among the inverter 50, the wire harness 101, and the motor 60. As a result, an excessive surge voltage may be applied to the motor 60.

In addition, a distance between wires in the respective wires 3a, 3b, and 3c of the wire portion 102 is relatively small in the conventional wire harness 101 illustrated in FIG. 29, and thus capacitances c among the respective wires 3a, 3b, and 3c increase, and noise is easily generated in the respective wires 3a, 3b, and 3c. In addition, since the respective wires 3a, 3b, and 3c are close to one another, each of the wires 3a, 3b, and 3c is easily affected by noise generated in another adjacent wire. For this reason, when noise is generated in the respective wires 3a, 3b, and 3c, radiated noise of the wire portion 102 is prone to increase. As a result, an excessive surge voltage may be generated.

When the excessive surge voltage is generated and input to the motor 60, the motor 60 is damaged such that dielectric breakdown occurs therein. Thus, measures have been taken hitherto. For example, a thickness of an insulator film such as a coil film inside the motor 60 has been increased to enhance a resistance to a surge voltage of the motor 60, or a surge voltage generation rate has been reduced as in Japanese Patent Application Laid-open No. 2004-343832.

Figure 3:
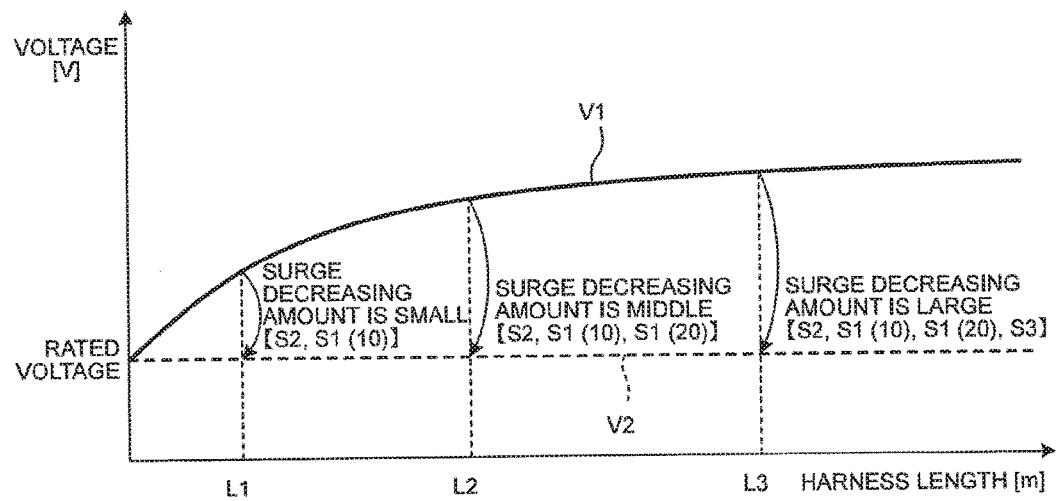
FIG. 3 is a diagram for explaining a mechanism for reducing a surge voltage by the wire harness illustrated in FIG. 2, and is a diagram illustrating a characteristic of the surge voltage according to a harness length.

FIG. 3 is a diagram for explaining a mechanism for reducing a surge voltage by the wire harness illustrated in FIG. 2, and is a diagram illustrating a characteristic of the surge voltage according to a harness length. A horizontal axis of FIG. 3 indicates a whole length (harness length) (m) of each of the wire harnesses 1 and 101, and a vertical axis thereof indicates a voltage (V) (hereinafter also mentioned as a "motor input voltage") input to the motor 60 in a system of the inverter 50 to the motor 60 illustrated in FIG. 1. A graph V1 of a solid line in FIG. 3 depicts a characteristic of a motor input voltage that varies according to a harness length in the conventional wire harness 101. Meanwhile, a graph V2 of a dotted line in FIG. 3 depicts a characteristic of a motor input voltage in the wire harness 1 of the present embodiment. The graph V1 contains a surge voltage generated inside the wire harness 101 in addition to a rated voltage of the motor 60, and a portion up from the rated voltage indicates a characteristic of a surge voltage according to a harness length. As described in the foregoing, the surge voltage is amplified in the wire harness 101 between the inverter 50 and the motor 60. Thus, as illustrated in FIG. 3, as a whole length of the wire harness 101 that connects between the inverter 50 and the motor 60 increases, a surge voltage generation rate is prone to increase.

Therefore, it is preferable that a decreasing amount of a surge voltage be allowed to be changed according to a whole length of a wire harness. A configuration for reducing a surge voltage has been proposed hitherto as in Japanese Patent Application Laid-open No. 2004-343832. However, for example, when the whole length of the wire harness corresponds to a length at which a surge voltage exceeding the decreasing amount of the surge voltage of the configuration may be generated, a circumstance, in which an effect of sufficiently reducing a surge voltage may not be obtained, can be considered.

On the other hand, the wire harness 1 according to the present embodiment is configured to dispose a plurality of surge reducing means for reducing a surge voltage in a distributed manner at respective places of components of the wire harness 1 according to a harness length, thereby ensuring a decreasing amount of the surge voltage. The wire harness 1 according to the present embodiment includes, as the plurality of surge reducing means, a "wire-side surge reducing means S1" provided in the wire portion 2 of the wire harness 1, a "connector-side surge reducing means S2" provided in each of the connectors 8 and 9 of the wire harness 1, and a "middle portion-side surge reducing means S3" provided in the middle portion 40 of the wire harness 1.

A decreasing amount of a surge voltage of each of the wire-side surge reducing means S1, the connector-side surge reducing means S2, and the middle portion-side surge reducing means S3 is demarcated based on, for example, a structural constraint. At least two of the wire-side surge reducing means S1, the connector-side surge reducing means S2, and the middle portion-side surge reducing means S3 can be selected, combined, and applied to the wire harness 1 of the present invention so as to achieve a desired decreasing amount of a surge voltage according to a harness length as illustrated in FIG. 3.

An example of applying a plurality of surge reducing means according to a harness length as described above will be described with reference to FIG. 3. The wire-side surge reducing means S1 of the present embodiment has two types of means corresponding to the first wire holding member 10 and the second wire holding member 20 to be described below, and symbols of the first wire holding member 10 and the second wire holding member 20 are indicated by S1 (10) and S1 (20) in FIG. 3.

Herein, as illustrated in FIG. 3, a relatively short length L1, a relatively long length L3, and a length L2 corresponding to a middle length between the length L1 and the length L3 are set as a harness length. At the shortest harness length L1, a relatively small surge decreasing amount is obtained by incorporating a group of surge reducing means including the connector-side surge reducing means S2 and the first wire holding member 10 (S1 (10)) of the wire-side surge reducing means S1 in the wire harness 1. In this way, a motor input voltage is decreased up to the rated voltage.

At the harness length L2 corresponding to the middle length, a surge voltage increases when compared to a case of the harness length L1 as illustrated in FIG. 3. Therefore, at the harness length L2, a larger surge decreasing amount when compared to the case of the harness length L1 is obtained by incorporating a group of surge reducing means, in which the second wire holding member 20 (S1 (20)) of the wire-side surge reducing means S1 is further added to S2 and S1 (10), in the wire harness 1. In this way, a motor input voltage at the harness length L2 is decreased up to the rated voltage.

At the harness length L3 corresponding to the longest length, a surge voltage increases when compared to a case of the harness length L2 as illustrated in FIG. 3. Therefore, at the harness length L3, a larger surge decreasing amount when compared to the case of the harness length L2 is obtained by incorporating a group of surge reducing means, in which the middle portion-side surge reducing means S3 is further added to S2, S1 (10), and S1 (20), in the wire harness 1. In this way, a motor input voltage at the harness length L3 is decreased up to the rated voltage.

As described above, the wire harness 1 of the present embodiment includes the wire-side surge reducing means S1 provided in the wire portion 2 to reduce a surge voltage, the connector-side surge reducing means S2 provided in each of the connectors 8 and 9 connected to end portions of the wire portion 2 to reduce a surge voltage, and the middle portion-side surge reducing means S3 provided in the middle portion 40 to reduce a surge voltage. The wire harness 1 can reduce a surge voltage by a proper decreasing amount according to the harness lengths L1, L2, and L3 by appropriately combining and using the plurality of surge reducing means. Thus, it is possible to maintain a motor input voltage at a certain rated voltage independently of a harness length. As a result, a surge voltage may be suitably suppressed. In addition, even when a wire harness length (surge voltage) varies for each vehicle, a necessary surge decreasing amount can be easily adjusted by adding or removing the plurality of surge reducing means inside the wire harness 1. Thus, a general-purpose property can be enhanced. Further, since a motor input voltage can be suitably reduced, the thickness of the insulator film (such as the coil film) of the motor 60 can be reduced, an output (power) of the inverter 50 can be increased, and a switching speed of the inverter 50 can be increased.

Combinations of the plurality of surge reducing means S1, S2, and S3 illustrated in FIG. 3 are merely examples, and another combination may be employed. At least two of the wire-side surge reducing means S1, the connector-side surge reducing means S2, and the middle portion-side surge reducing means S3 may be used. For example, it is possible to apply a combination of the connector-side surge reducing means S2 and the middle portion-side surge reducing means S3, a combination of the first wire holding member 10 of the wire-side surge reducing means S1 and the middle portion-side surge reducing means S3, or a combination of the second wire holding member 20 of the wire-side surge reducing means S1 and the middle portion-side surge reducing means S3 in addition to the combinations illustrated in FIG. 3.

In addition, when the whole length of the wire harness 1 is short, a configuration in which the middle portion 40 is not provided can be considered. In this case, it is possible to apply a combination of the first wire holding member 10 of the wire-side surge reducing means S1 and the connector-side surge reducing means S2 or a combination of the second wire holding member 20 of the wire-side surge reducing means S1 and the connector-side surge reducing means S2

Next, a description will be separately given of respective specific configurations of the wire-side surge reducing means S1, the connector-side surge reducing means S2, and the middle portion-side surge reducing means S3.

Wire-side Surge Reducing Means S1

The wire-side surge reducing means S1 is a surge reducing means provided in the wire portion 2 among components of the wire harness 1. The wire-side surge reducing means S1 includes the first wire holding member 10 and the second wire holding member 20. The wire harness 1 of the present embodiment can selectively apply both or one of the first wire holding member 10 and the second wire holding member 20 of the wire-side surge reducing means S1 to achieve a desired decreasing amount of a surge voltage according to a harness length. Hereinafter, a description will be separately given of specific configurations of the first wire holding member 10 and the second wire holding member 20.

First Wire Holding Member 10

Figure 4:
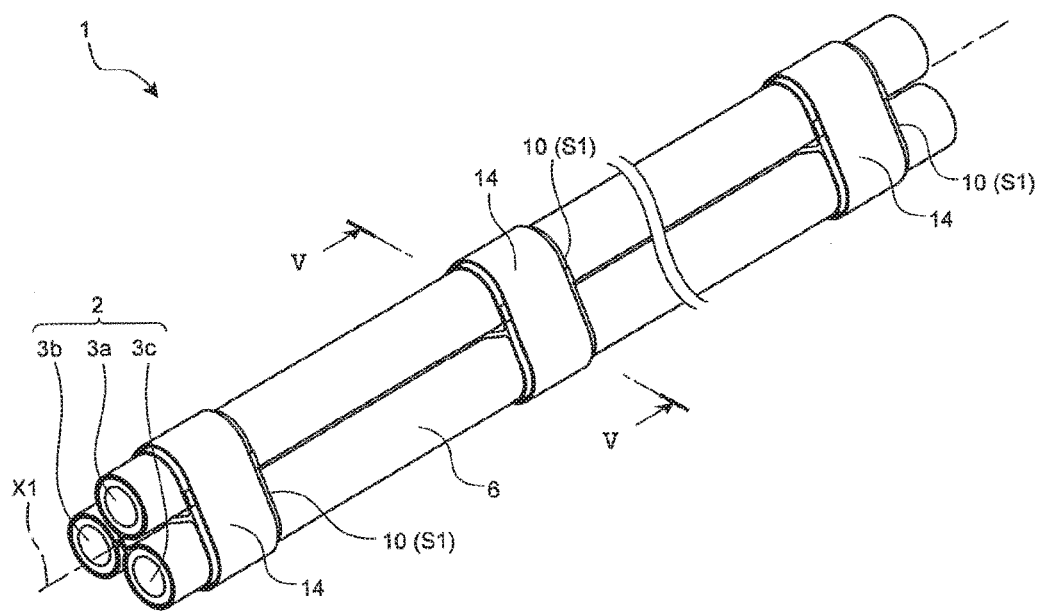
FIG. 4 is a perspective view illustrating a configuration in a portion coated with a corrugated tube including a first wire holding member in the wire harness illustrated in FIG. 2.
Figure 6:
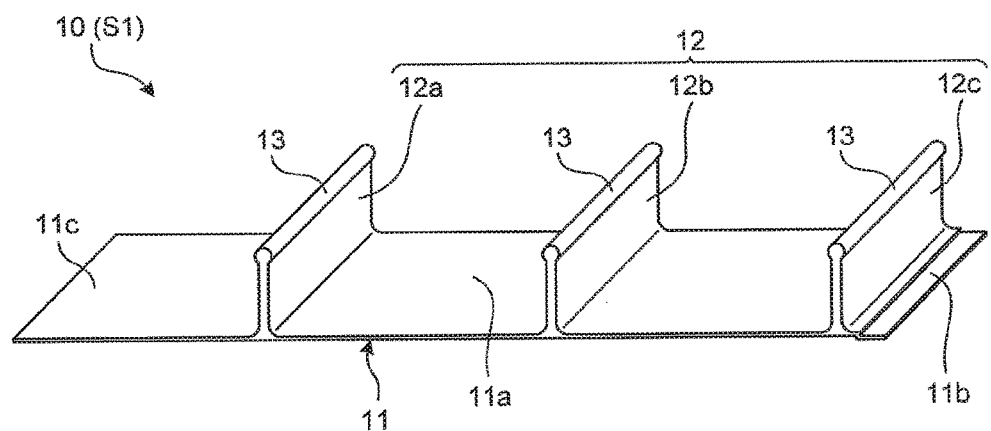
FIG. 6 is a perspective view illustrating a state in which the first wire holding member of FIGS. 4 and 5 is spread.

A description will be given of the first wire holding member 10 with reference to FIGS. 4 to 6. FIG. 4 is a perspective view illustrating a configuration in a portion coated with a corrugated tube including the first wire holding member in the wire harness illustrated in FIG. 2. FIG. 5 is a cross-sectional view taken along V-V line of FIG. 4, and is an axial sectional view of a portion including the first wire holding member of the wire harness according to an embodiment of the present invention. FIG. 6 is a perspective view illustrating a state in which the first wire holding member of FIGS. 4 and 5 is spread.

The first wire holding member 10 is a member that further surrounds the wire portion 2 and the braided wire 6, which collectively surrounds the outer circumferential side of the wire portion 2, from an outer circumferential side. The first wire holding member 10 is installed on the outer circumferential side of the wire portion 2 and the braided wire 6 such that arrangement of the respective wires 3a, 3b, and 3c of the wire portion 2 around the central axial line X1 is maintained and a coated form of the braided wire 6 with respect to the wire portion 2 can be maintained as in configurations (1) to (4) below. For example, the first wire holding member 10 is formed by synthetic resin.

The first wire holding member 10 alternately disposes the three wires 3a, 3b, and 3c of the wire portion 2 and the braided wire 6 along the outer circumferential direction around the central axial line X1 of the wire portion 2. In other words, the first wire holding member 10 coats the wire portion 2 with the braided wire 6 such that the braided wire 6 is disposed between two wires adjacent to each other in the circumferential direction in the three wires 3a, 3b, and 3c evenly disposed along the circumferential direction around the central axial line X1. That is, the braided wire 6 is sandwiched between two wires adjacent to each other in the circumferential direction among the three wires 3a, 3b, and 3c of the wire portion 2 in a state in which the first wire holding member 10 is attached to a circumference of the wire portion 2 and the braided wire 6.

More specifically, as illustrated in FIG. 5, on the cross section of the wire harness 1 when viewed from the axial direction along the central axial line X1, (1) the outer circumferential side of the wire portion 2 is collectively surrounded, and (2) the three wires 3a, 3b, and 3c of the wire portion 2 and the braided wire 6 are disposed such that the braided wire 6 is interposed between two wires of the wire portion 2 adjacent to each other along the circumferential direction around the central axial line X1 of the wire portion 2 on a side of the central axial line X1 from an outer circumferential-side tangent that connects conductors of the two wires.

The item (2) is described in detail below. The braided wire 6 approaches the side of the central axial line X1 from an outer circumferential-side tangent A1 that touches the conductor 4a of the wire 3a and the conductor 4b of the wire 3b at the same time from the outer circumferential side between the wire 3a and the wire 3b of the wire portion 2 adjacent to each other in the circumferential direction. Similarly, the braided wire 6 approaches the side of the central axial line X1 from an outer circumferential-side tangent A2 that touches the conductor 4b of the wire 3b and the conductor 4c of the wire 3c at the same time from the outer circumferential side between the wire 3b and the wire 3c of the wire portion 2 adjacent to each other in the circumferential direction. Similarly, the braided wire 6 approaches the side of the central axial line X1 from an outer circumferential-side tangent A3 that touches the conductor 4c of the wire 3c and the conductor 4a of the wire 3a at the same time from the outer circumferential side between the wire 3c and the wire 3a of the wire portion 2 adjacent to each other in the circumferential direction.

Moreover, on the cross section of the wire harness 1 illustrated in FIG. 5, the braided wire 6 is formed to (1) collectively surround the outer circumferential side of the wire portion 2, and (3) approach the side of the central axial line X1 from a segment connecting center of gravity points of two wires adjacent to each other in the circumferential direction between the two wires. The item (3) is described in detail below. The braided wire 6 approaches the side of the central axial line X1 from a segment B1 connecting a center of gravity point Ya of the wire 3a and a center of gravity point Yb of the wire 3b between the wire 3a and the wire 3b adjacent to each other in the circumferential direction. Similarly, the braided wire 6 approaches the side of the central axial line X1 from a segment B2 connecting a center of gravity point Yb of the wire 3b and a center of gravity point Yc of the wire 3c between the wire 3b and the wire 3c adjacent to each other in the circumferential direction. Similarly, the braided wire 6 approaches the side of the central axial line X1 from a segment B3 connecting a center of gravity point Yc of the wire 3c and a center of gravity point Ya of the wire 3a between the wire 3c and the wire 3a adjacent to each other in the circumferential direction.

Moreover, on the cross section of the wire harness 1 illustrated in FIG. 5, the braided wire 6 is formed to (4) approach up to the central axial line X1 from between two wires of the wire portion 2 adjacent to each other in the circumferential direction, and surround outer circumferential sides of the respective wires 3a, 3b, and 3c of the wire portion 2.

As illustrated in FIGS. 5 and 6, the first wire holding member 10 includes an external form maintaining portion 11 and a plurality of braid form correction portions 12 (12a, 12b, and 12c) (shield member form correcting portions). The external form maintaining portion 11 surrounds the outer circumferential side of the wire portion 2 and the braided wire 6. As illustrated in FIG. 6, the external form maintaining portion 11 corresponds to a substantially rectangular sheet material, and is formed to surround the outer circumferential side of the wire portion 2 around the central axial line X1. In addition, a long side of the external form maintaining portion 11 is formed at a sufficient size to surround the wire portion 2, and a short side of the external form maintaining portion 11 is formed at a size to cover a portion in a longitudinal direction of the respective wires 3a, 3b, and 3c of the wire portion 2 (also see FIG. 4). Further, a stepped portion 11b, which has a level difference to be recessed from one principal surface 11a (a surface coming into contact with the wire portion 2 when wound around the wire portion 2, hereinafter also referred to as an "inner circumferential surface 11a") to the other principal surface, is provided over a whole area in a short-side direction at one end portion in a long-side direction of the external form maintaining portion 11. The level difference of the stepped portion 11b is substantially equivalent to a thickness of the external form maintaining portion 11. The external form maintaining portion 11 may fully surround the outer circumferential side of the wire portion 2 by being wound around the wire portion 2 such that an end portion 11c on the opposite side of the stepped portion 11b in the long-side direction abuts the stepped portion 11b.

As illustrated in FIG. 6, each of the plurality of braid form correction portions 12 is a plate-shaped member which is provided by being erected from the inner circumferential surface 11a of the external form maintaining portion 11 to extend in the short-side direction. The plurality of braid form correction portions 12 is disposed at equal intervals in the long-side direction of the external form maintaining portion 11. The number of braid form correction portions 12 is the same as the number of wires included in the wire portion 2. In the present embodiment, three braid form correction portions 12a, 12b, and 12c are disposed at equal intervals in the long-side direction on the inner circumferential surface 11a of the external form maintaining portion 11. As illustrated in FIG. 5, the respective braid form correction portions 12a, 12b, and 12c are configured to project from the inner circumferential surface 11a of the external form maintaining portion 11 in a direction of the central axial line X1 in a state in which the first wire holding member 10 is wound around the outer circumferential side of the wire portion 2.

Intervals and height dimensions of the respective braid form correction portions 12a, 12b, and 12c are set such that each of the braid form correction portions 12a, 12b, and 12c is inserted between two wires of the wire portion 2 adjacent to each other along the circumferential direction around the central axial line X1 of the wire portion 2 and a distal end portion 13 thereof reaches up to a position that satisfies any one of the configurations (2) to (4) for coating the wire portion 2 with the braided wire 6 (in the present embodiment, the configuration (4), that is, a position of the central axial line X1) in the state in which the first wire holding member 10 is wound around the outer circumferential side of the wire portion 2. In the present embodiment, as illustrated in FIG. 5, the braid form correction portion 12a is formed such that the braid form correction portion 12a is inserted between the wire 3a and the wire 3b adjacent to each other in the circumferential direction and the distal end portion 13 thereof reaches up to the central axial line X1. Similarly, the braid form correction portion 12b is formed such that the braid form correction portion 12b is inserted between the wire 3b and the wire 3c adjacent to each other in the circumferential direction and the distal end portion 13 thereof reaches up to the central axial line X1. Similarly, the braid form correction portion 12c is formed such that the braid form correction portion 12c is inserted between the wire 3c and the wire 3a adjacent to each other in the circumferential direction and the distal end portion 13 thereof reaches up to the central axial line X1.

In this way, when the first wire holding member 10 surrounds the outer circumferential side of the wire portion 2, the braid form correction portions 12 are configured to allow the braided wire 6 disposed between the wire portion 2 and the first wire holding member 10 to approach up to the position that satisfies any one of the configurations (2) to (4) for coating the wire portion 2 with the braided wire 6 (in the present embodiment, the configuration (4), that is, the position of the central axial line X1) between two wires of the wire portion 2 adjacent to each other along the circumferential direction around the central axial line X1 of the wire portion 2.

The distal end portion 13 of each of the braid form correction portions 12a, 12b, and 12c has a circular shape on a cross section when viewed from the axial direction along the central axial line X1. In this way, when the first wire holding member 10 surrounds the outer circumferential side of the wire portion 2, the braided wire 6 may be prevented from being damaged by the distal end portion 13 that pushes the braided wire 6 to a side of the central axial line X1. The "circular shape" used herein may not correspond to a perfect circle, and may include a shape of a convex curve which does not have any corner.

With regard to the first wire holding member 10 having the above configuration, in the wire harness 1 of the present embodiment, as illustrated in FIG. 4, a plurality of first wire holding members 10 is installed at predetermined intervals along a direction in which the respective wires 3a, 3b, and 3c of the wire portion 2 extend (direction of the central axial line X1). A size in a longitudinal direction of a wire (size in the short-side direction of the external form maintaining portion 11) of each of the first wire holding members 10 is set to a length at which a portion of the wire portion 2 in the longitudinal direction can be surrounded.

For example, the first wire holding member 10 having the above configuration can be incorporated in the wire harness 1 in the following processes (i) to (vi).

(i) First, as illustrated in FIG. 6, the plurality of first wire holding members 10 is placed on one plane in a state in which the external form maintaining portion 11 is spread such that the inner circumferential surface 11a is in an upper portion. In this instance, the plurality of first wire holding members 10 is disposed at predetermined intervals along a direction in which the braid form correction portions 12a, 12b, and 12c extend (the short-side direction of the external form maintaining portion 11). In addition, the plurality of first wire holding members 10 is disposed by arranging positions of the braid form correction portions 12a, 12b, and 12c of each of the first wire holding members 10. The number of the plurality of first wire holding members 10 is prepared according to a length of the wire portion 2.

(ii) Subsequently, the braided wire 6 is placed on the plurality of first wire holding members 10 which is placed on the one plane in the process (i). The braided wire 6 is formed to have a size for covering a whole of the plurality of first wire holding members 10.

(iii) Subsequently, the wires 3a, 3b, and 3c are further placed on the braided wire 6, which is placed in the process (ii), along the direction in which the braid form correction portions 12a, 12b, and 12c extend. More specifically, the wire 3a is disposed between the end portion 11c of the external form maintaining portion 11 and the braid form correction portion 12a, the wire 3b is disposed between the braid form correction portion 12a and the braid form correction portion 12b, and the wire 3c is disposed between the braid form correction portion 12b and the braid form correction portion 12c.

(iv) Subsequently, in each of the plurality of first wire holding members 10 placed as in the process (iii), the external form maintaining portion 11 is rolled up in a direction in which the distal end portions 13 of the braid form correction portions 12a, 12b, 12c are put together, the stepped portion 11b is superimposed on an outer circumferential side of the end portion 11c, and the external form maintaining portion 11 surrounds the wire portion 2.

(v) Subsequently, a tape 14 illustrated in FIG. 4 is wound around an outer circumference of the external form maintaining portion 11 that surrounds the wire portion 2 in the process (iv), and the first wire holding member 10 is fixed around the wire portion 2 and the braided wire 6. When the tape 14 is wound, the external form maintaining portion 11 of the first wire holding member 10 may be prevented from being opened and unfastened from around the wire portion 2. In this instance, the respective wires 3a, 3b, and 3c of the wire portion 2 are evenly disposed around the central axial line X1. In addition, the plurality of respective first wire holding members 10 is formed to surround a portion in the longitudinal direction of the wire portion 2, and is installed at predetermined intervals along the longitudinal direction of the wire portion 2.

(vi) Subsequently, as illustrated in FIG. 2, the corrugated tube 7 is further installed on the outer circumference of the wire portion 2 to which the first wire holding members 10 are fixed in the process (v), the connectors 8 and 9 are connected to both ends of the wire portion 2, and the wire harness 1 is assembled.

Next, a description will be given of effects of the first wire holding member 10.

The first wire holding member 10 includes the external form maintaining portion 11 and the plurality of braid form correction portions 12a, 12b, 12c. The external form maintaining portion 11 surrounds a further outer circumferential side of the wire portion 2, which is formed by arranging the three wires 3a, 3b, and 3c having the conductors 4a, 4b, and 4c and the insulators 5a, 5b, and 5c that coat the outer circumferences of the conductors 4a, 4b, and 4c, respectively, in the same direction, and the braided wire 6 that collectively surrounds the outer circumferential side of the wire portion 2. The plurality of respective braid form correction portions 12a, 12b, 12c is formed to project in the direction of the central axial line X1 of the wire portion 2 from the inner circumferential surface 11a of the external form maintaining portion 11 between two wires of the wire portion 2 adjacent to each other along the circumferential direction around the central axial line X1 of the wire portion 2 among the respective wires 3a, 3b, and 3c of the wire portion 2 such that the braided wire 6 approaches the side of the central axial line X1 from the outer circumferential-side tangents A1, A2, and A3 connecting the conductors 4a, 4b, and 4c of the two wires on the cross section viewed from the axial direction along the central axial line X1.

According to these configurations, when the braided wire 6 is interposed between the two wires adjacent to each other in the circumferential direction among the wires 3a, 3b, and 3c of the wire portion 2 at all times, at least half a portion in which the wires directly face each other can be shielded by the braided wire 6. Thus, it is possible to reduce the capacitances c among the respective wires 3a, 3b, and 3c of the wire portion 2, to suppress generation of noise of the respective wires 3a, 3b, and 3c, and to reduce influence of noise generated in another adjacent wire. In addition, there is need to provide a gap between wires adjacent to each other in the circumferential direction to obtain a configuration in which the braided wire 6 is sandwiched between the respective wires 3a, 3b, and 3c. Thus, a distance between wires increases when compared to the conventional wire harness 101. For this reason, it is possible to further reduce influence of noise generated in another adjacent wire. Accordingly, the wire harness 1 of the present embodiment may sufficiently reduce radiated noise of the wire portion 2 by applying the first wire holding member 10 as the wire-side surge reducing means S1. As a result, it is possible to suitably suppress generation of a surge voltage.

In addition, when the first wire holding member 10 is attached to the outer circumferential side of the wire portion 2 and the braided wire 6, the braided wire 6 can maintain a state in which the braided wire 6 is pushed into between the respective wires of the wire portion 2 by the plurality of braid form correction portions 12a, 12b, 12c projecting to an inner circumference side. That is, as described above, it is possible to suitably maintain a shape of the braided wire 6 that can suitably suppress generation of a surge voltage and a proper positional relation between the braided wire 6 and the respective wires 3a, 3b, and 3c of the wire portion 2. In this way, the first wire holding member 10 can sustain an effect of suppressing a surge voltage for a long period of time in the wire harness 1 in which the first wire holding member 10 is incorporated.

Further, in the first wire holding member 10, the distal end portion 13 of each of the braid form correction portions 12a, 12b, 12c has the circular shape on the cross section when viewed from the axial direction along the central axial line X1. When the first wire holding member 10 is wound around the wire portion 2 and the braided wire 6, the distal end portion 13 of each of the braid form correction portions 12a, 12b, 12c pushes the braided wire 6 into between wires. In the present embodiment, when the distal end portion 13 is formed in the circular shape as in the above configuration, the distal end portion 13 can be rarely resisted by the braided wire 6. Thus, it is possible to smoothly perform an operation of pushing the braided wire 6 into between wires by the braid form correction portions 12a, 12b, 12c, and to prevent the braided wire 6 from being damaged by this operation.

Furthermore, in the wire harness 1 according to the present embodiment, the wires 3a, 3b, and 3c of the wire portion 2 have the circular shapes on the cross section of the wire harness 1 illustrated in FIG. 5, and are evenly disposed along the circumferential direction. The braid form correction portions 12a, 12b, 12c of the first wire holding member 10 are formed such that the braided wire 6 approaches the side of the central axial line X1 from the segments B1, B2, and B3 connecting center of gravity points of two wires adjacent to each other in the circumferential direction among the respective wires 3a, 3b, and 3c of the wire portion 2 between the two wires on the cross section of the wire harness 1 illustrated in FIG. 5.

According to this configuration, it is possible to shield more than half a portion, in which two wires adjacent to each other in the circumferential direction among the respective wires 3a, 3b, and 3c of the wire portion 2 directly face each other, by the braided wire 6. Therefore, it is possible to reduce the capacitances c among the respective wires 3a, 3b, and 3c of the wire portion 2 nearly up to 0, and to reliably suppress generation of noise of the respective wires 3a, 3b, and 3c. Further, it is possible to reliably reduce influence of noise of an adjacent wire. In this way, it is possible to reliably reduce radiated noise of the wire portion 2. As a result, it is possible to more reliably suppress generation of a surge voltage.

In addition, in the wire harness 1 according to the present embodiment, the braid form correction portions 12a, 12b, 12c of the first wire holding member 10 are formed such that the braided wire 6 approaches up to the central axial line X1 from between two wires of the wire portion 2 adjacent to each other in the circumferential direction on the cross section of the wire harness 1 illustrated in FIG. 5, and surround the respective outer circumferential sides of the wires 3a, 3b, and 3c of the wire portion 2. According to this configuration, the respective wires 3a, 3b, and 3c of the wire portion 2 are separately coated with the braided wire 6, and thus the capacitances c among the respective wires 3a, 3b, and 3c of the wire portion 2 can be set to 0. In this way, it is possible to more reliably suppress generation of noise of the respective wires 3a, 3b, and 3c, and to shield influence of noise of an adjacent wire. As a result, it is possible to more reliably suppress generation of a surge voltage.

In addition, in the wire harness 1 according to the present embodiment, the braided wire 6 formed by weaving a metal thin wire in a mesh shape is used as the shield member. According to this configuration, the braided wire 6 is freely stretched due to the mesh shape of the thin wire. Thus, the wire portion 2 can be easily coated with the braided wire 6, and the wire harness 1 can retain a property of being easily bent.

Herein, in the wire harness 1 according to the present embodiment, the braided wire 6 is sandwiched among the respective wires 3a, 3b, and 3c of the wire portion 2, and the wires 3a, 3b, and 3c and the braided wire 6 are disposed to face each other along the circumferential direction. For this reason, a distance between the wires 3a, 3b, and 3c and the braided wire 6 becomes short, and thus noise is easily generated between the wires 3a, 3b, and 3c and the braided wire 6. On the other hand, in the wire harness 1 according to the present embodiment, the braided wire 6 is grounded, and thus noise can be released from the grounded braided wire 6. In addition, since an electrified area between the wires 3a, 3b, and 3c and the braided wire 6 increases, a capacitance c between the wires 3a, 3b, and 3c and the braided wire 6 increases, and noise easily passes between the wires 3a, 3b, and 3c and the braided wire 6. That is, noise generated between the wires 3a, 3b, and 3c and the braided wire 6 may be more easily absorbed by the braided wire 6. In this way, it is possible to further reduce radiated noise of the wire portion 2, and to further suppress generation of a surge voltage.

In addition, in the wire harness 1 according to the present embodiment, the first wire holding member 10 is formed to surround the portion in the longitudinal direction of the wire portion 2, and the plurality of first wire holding members 10 is installed at predetermined intervals along the longitudinal direction of the wire portion 2. According to this configuration, a region in which the wire portion 2 is surrounded by the first wire holding members 10 can be narrowed to a portion in the longitudinal direction, and thus plasticity (property of being easily bent) of the wire portion 2 not surrounded by the first wire holding members 10 can be maintained. In this way, the wire harness 1 according to the present embodiment can favorably maintain plasticity of the wire portion 2 while exhibiting an effect of reducing a surge voltage by installation of the first wire holding members 10.

As illustrated in FIG. 4, the above embodiment illustrates an example of a configuration in which the wire harness 1 includes the plurality of first wire holding members 10 and each of the first wire holding members 10 is formed to surround a portion in the longitudinal direction of the wire portion 2. However, a configuration of the first wire holding members 10 is not limited thereto. For example, it is possible to employ a configuration in which the wire harness 1 includes a single first wire holding member 10 and this first wire holding member 10 surrounds a whole area in the longitudinal direction of the wire portion 2. According to this configuration, a region in which the first wire holding member 10 touches the wire portion 2 can increase. Thus, it is possible to more firmly maintain the shape of the braided wire 6 that can suitably suppress generation of a surge voltage and arrangement of the braided wire 6 and the respective wires 3a, 3b, and 3c of the wire portion 2, and to sustain an effect of suppressing a surge voltage of the wire harness 1 for a long period of time.

In addition, as illustrated in FIG. 4, the above embodiment illustrates an example of a configuration in which the first wire holding member 10 is fixed to the outer circumferential side of the wire portion 2 by winding the tape 14 around an outer circumferential side of the first wire holding member 10. However, another scheme may be employed as a scheme of fixing the first wire holding member 10. For example, the first wire holding member 10 may include a binding band mechanism, and the first wire holding member 10 can be fixed to the outer circumferential side of the wire portion 2 by the binding band mechanism.

Second Wire Holding Member 20

Figure 7:
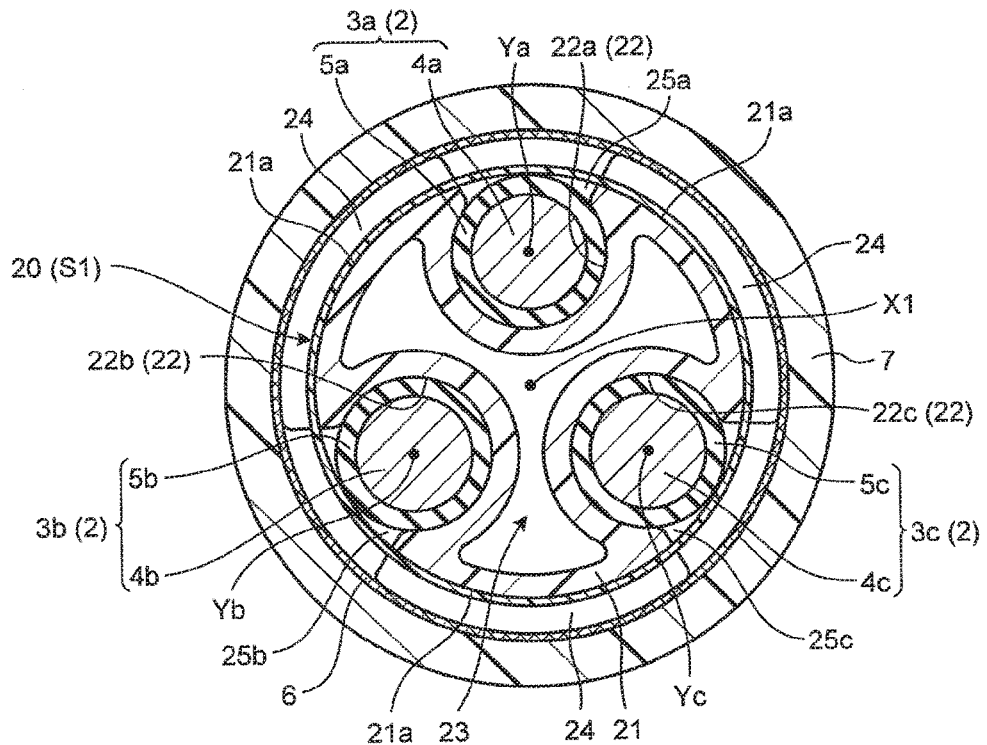
FIG. 7 is a cross-sectional view taken along the VII-VII line of FIG. 8, and is an axial sectional view of a portion including the second wire holding member in the wire harness illustrated in FIG. 2.
Figure 8:
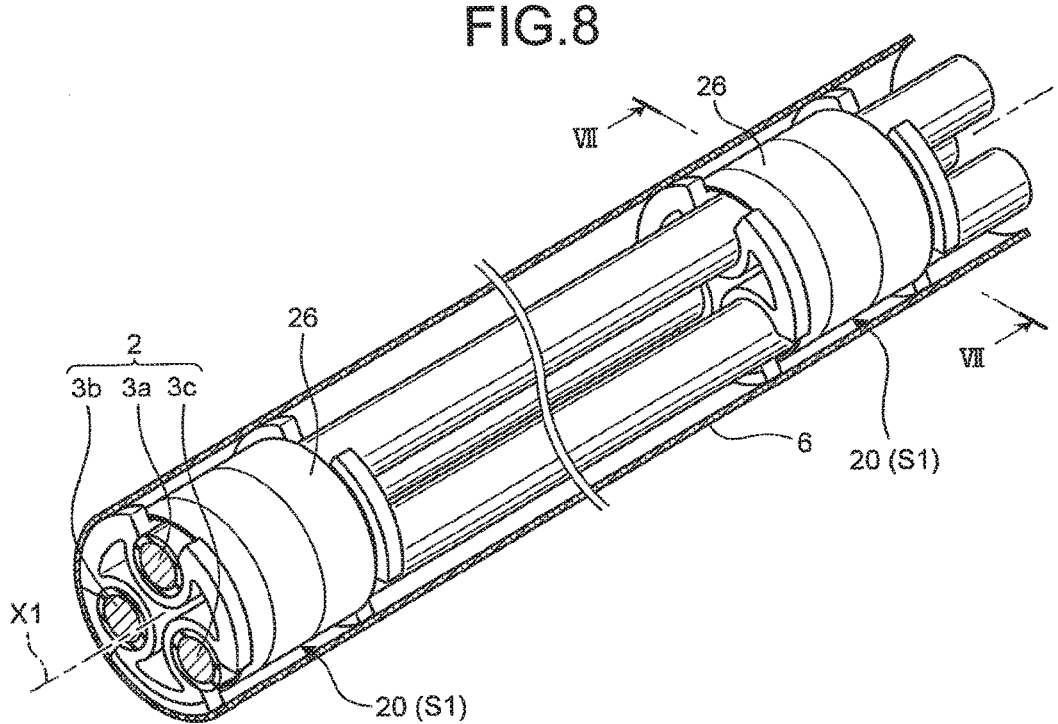
FIG. 8 is a perspective view illustrating a configuration in a portion coated with a corrugated tube including the second wire holding member in the wire harness illustrated in FIG. 2.
Figure 9:
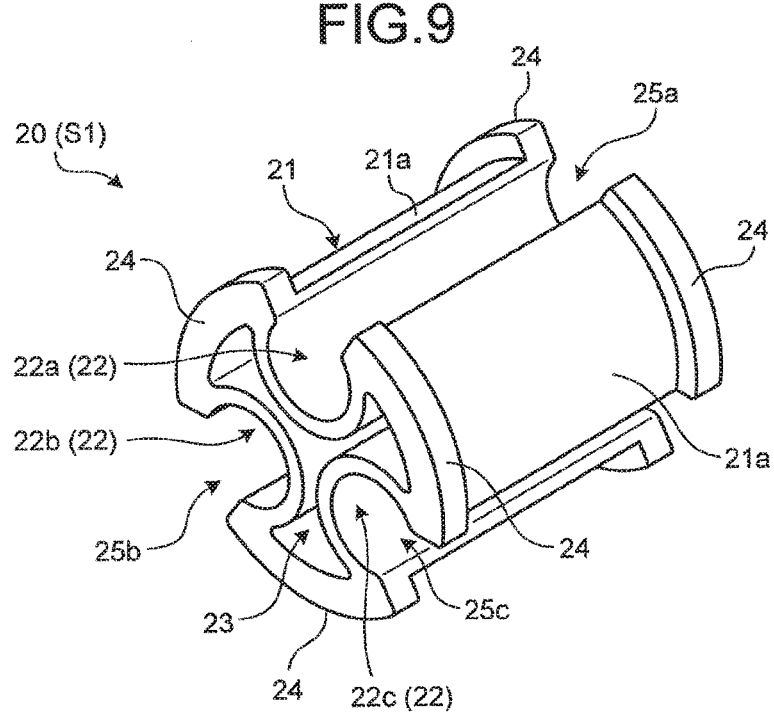
FIG. 9 is a perspective view of the second wire holding member of FIGS. 7 and 8.

A description will be given of the second wire holding member 20 with reference to FIGS. 7 to 9. FIG. 7 is a cross-sectional view taken along the VII-VII line of FIG. 8, and is an axial sectional view of a portion including the second wire holding member in the wire harness illustrated in FIG. 2. FIG. 8 is a perspective view illustrating a configuration in a portion coated with a corrugated tube including the second wire holding member in the wire harness illustrated in FIG. 2. FIG. 9 is a perspective view of the second wire holding member of FIGS. 7 and 8.

The second wire holding member 20 is a member that maintains arrangement of the respective wires 3a, 3b, and 3c of the wire portion 2 around the central axial line X1. As illustrated in FIGS. 7 and 8, the second wire holding member 20 is configured to be able to maintain a proper positional relation of the respective wires 3a, 3b, and 3c of the wire portion 2 by accommodating and holding the respective wires 3a, 3b, and 3c of the wire portion 2 therein. For example, the second wire holding member 20 is formed as an integrated body using synthetic resin. A material of the second wire holding member 20 is preferably a low dielectric constant material.

As illustrated in FIGS. 7 and 9, the second wire holding member 20 includes a main body portion 21, a plurality of wire housing portions 22 (22a, 22b, and 22c), a space portion 23, and an outer edge portion 24.

The main body portion 21 is a member formed in a cylindrical shape centered on the central axial line X1. The main body portion 21 has an outer circumferential surface 21a around the central axial line X1. The outer circumferential surface 21a is divided into a plurality of pieces along the circumferential direction around the central axial line X1 by the plurality of wire housing portions 22. In the present embodiment, the outer circumferential surface 21a of the main body portion 21 is divided into three pieces along the circumferential direction by the three wire housing portions 22a, 22b, and 22c.

The plurality of respective wire housing portions 22 is provided by penetrating the main body portion 21 along the central axial line X1, and is formed to be able to separately accommodate the respective wires 3a, 3b, and 3c of the wire portion 2. The respective wire housing portions 22 are disposed at equal intervals along the circumferential direction around the central axial line X1 on a cross section (axial cross section) viewed from the axial line along the central axial line X1 illustrated in FIG. 7. The number of wire housing portions 22 is the same as the number of wires included in the wire portion 2. In the present embodiment, the three wire housing portions 22a, 22b, and 22c are provided by penetrating the main body portion 21 along the central axial line X1, and are formed to be able to separately accommodate the three wires 3a, 3b, and 3c of the wire portion 2. In addition, the three wire housing portions 22a, 22b, and 22c are disposed at equal intervals along the circumferential direction around the central axial line X1 on the cross section viewed from the axial line along the central axial line X1. That is, the wire housing portions 22a, 22b, and 22c are disposed in a shape of a trefoil similarly to the respective wires 3a, 3b, and 3c of the wire portion 2. When the respective wires 3a, 3b, and 3c of the wire portion 2 are separately accommodated in the wire housing portions 22a, 22b, and 22c disposed in this way, the wire portion 2 may be held while a proper positional relation of the respective wires 3a, 3b, and 3c of the wire portion 2 is maintained.

The wire housing portions 22a, 22b, and 22c are formed such that a visible outline of the wires 3a, 3b, and 3c accommodated in the wire housing portions 22a, 22b, and 22c at least touches a visible outline of the cylindrical shape of the main body portion 21 from an inner circumference side on the axial cross section illustrated in FIG. 7. More specifically, the wire housing portions 22a, 22b, and 22c are formed such that the visible outline of the respective wires 3a, 3b, and 3c accommodated in the wire housing portions 22a, 22b, and 22c touches a visible outline of the outer circumferential surface 21a of the main body portion 21 from an inner side (the side of the central axial line X1) on the axial cross section illustrated in FIG. 7. According to this configuration, while the wires 3a, 3b, and 3c are accommodated in the wire housing portions 22a, 22b, and 22c, a circumferential surface on an outermost circumferential side of the wires 3a, 3b, and 3c can be disposed on the same outer circumferential surface as the outer circumferential surface 21a of the main body portion 21, and a tape 26 can be easily wound around the outer circumferential surface 21a. As illustrated in FIG. 8, when the wires 3a, 3b, and 3c are accommodated in the wire housing portions 22a, 22b, and 22c, and the tape 26 is wound around the outer circumferential surface 21a of the main body portion 21, the wires 3a, 3b, and 3c of the wire portion 2 can be fixed to the second wire holding member 20.

In addition, the wire housing portions 22a, 22b, and 22c are formed such that the wires 3a, 3b, and 3c may be fit into the wire housing portions 22a, 22b, and 22c from an outer circumferential side of the main body portion 21. As illustrated in FIG. 9, the wire housing portions 22a, 22b, and 22c have openings 25a, 25b, and 25c formed over a whole area of the main body portion 21 along the central axial line X1 on the outer circumferential surface 21a of the main body portion 21. That is, the wire housing portions 22a, 22b, and 22c extend in the direction of the central axial line X1 on the outer circumferential surface 21a, and cross sections thereof are formed as arc-shaped grooves. In addition, a radius of curvature of an inner circumferential surface of each of the wire housing portions 22a, 22b, and 22c is set to be equivalent to a radius of a cross-sectional circle of each of the wires 3a, 3b, and 3c accommodated in the respective wire housing portions 22a, 22b, and 22c. That is, as illustrated in FIG. 7, while the wires 3a, 3b, and 3c are accommodated in the wire housing portions 22a, 22b, and 22c, outer circumferential surfaces of the wires 3a, 3b, and 3c come into contact with inner circumferential surfaces of the wire housing portions 22a, 22b, and 22c, and the wire housing portions 22a, 22b, and 22c and the wires 3a, 3b, and 3c are disposed on concentric circles on the axial cross section illustrated in FIG. 7. According to this configuration, the wire housing portions 22a, 22b, and 22c can fit the wires 3a, 3b, and 3c into the wire housing portions 22a, 22b, and 22c from the openings 25a, 25b, and 25c on the outer circumferential surface 21a of the main body portion 21.

Opening widths in the circumferential direction of the openings 25a, 25b, and 25c of the wire housing portions 22a, 22b, and 22c are set to be smaller than diameters of the cross-sectional circles of the wires 3a, 3b, and 3c. In this way, it is preferable to have a configuration in which the wires 3a, 3b, and 3c rarely escape from the wire housing portions 22a, 22b, and 22c in which the wires 3a, 3b, and 3c are accommodated.

The space portion 23 is a through-hole portion separated from the plurality of wire housing portions 22a, 22b, and 22c and formed by penetrating the main body portion 21 along the central axial line X1. The space portion 23 is formed in an integrated manner from between two wire housing portions adjacent to each other along the circumferential direction around the central axial line X1 among the plurality of wire housing portions 22a, 22b, and 22c up to the central axial line X1 on the axial cross section illustrated in FIG. 7. In other words, the space portion 23 is radially formed in three directions to reach up to a rear of the outer circumferential surface 21a through gaps among the respective wire housing portions 22a, 22b, and 22c from the central axial line X1 on the axial cross section illustrated in FIG. 7. When the above-described space portion 23 is provided, the plurality of wire housing portions 22a, 22b, and 22c is disposed to be spaced apart without touching each other in the circumferential direction around the central axial line X1.

The outer edge portion 24 is erected from the outer circumferential surface 21a of the cylindrical shape of the main body portion 21, and is formed to extend along the circumferential direction. In the present embodiment, the outer edge portion 24 is provided at both end portions in the axial direction of the main body portion 21. The outer edge portion 24 functions as an external form maintaining portion that maintains an external shape of the corrugated tube 7 in a circular shape by touching the braided wire 6 and the corrugated tube 7 when the braided wire 6 and the corrugated tube 7 are wrapped around the second wire holding member 20.

With regard to the second wire holding member 20 having the above configuration, in the wire harness 1 of the present embodiment, as illustrated in FIG. 8, a plurality of second wire holding members 20 is installed at predetermined intervals along a direction in which the respective wires 3a, 3b, and 3c of the wire portion 2 extend (direction of the central axial line X1). A size in the direction of the central axial line X1 of each of the second wire holding members 20 is set to a length at which a portion of the wire portion 2 in the longitudinal direction can be surrounded.

For example, the second wire holding members 20 having the above configuration are incorporated in the wire harness 1 in the following procedure. As illustrated in FIG. 8, first, the plurality of second wire holding members 20 is disposed at predetermined intervals along the predetermined central axial line X1, and the wires 3a, 3b, and 3c are fit into the wire housing portions 22a, 22b, and 22c of the respective second wire holding members 20, respectively. Subsequently, the tape 26 is wound around the outer circumferential surface 21a of the main body portion 21, and the respective wires 3a, 3b, and 3c of the wire portion 2 are fixed to the second wire holding members 20. In this way, a proper positional relation of the respective wires 3a, 3b, and 3c of the wire portion 2 is maintained.

Then, the outer circumferential side of the wire portion 2 held by the second wire holding members 20 is coated with the braided wire 6. Further, the corrugated tube 7 is installed on an outer circumference thereof as illustrated in FIGS. 2 and 7. In this instance, as illustrated in FIG. 7, the external shape of the corrugated tube 7 is maintained in a circular shape when the outer edge portion 24 of the second wire holding member 20 abuts against the braided wire 6 and the corrugated tube 7 from an inner circumference side. Thereafter, the connectors 8 and 9 are connected to the both ends of the wire portion 2, and the wire harness 1 is assembled.

Next, a description will be given of effects of the second wire holding member 20.

The second wire holding member 20 includes the main body portion 21 formed in a cylindrical shape using the central axial line X1 as an axial center, the plurality of wire housing portions 22a, 22b, and 22c, which is provided by penetrating the main body portion 21 along the central axial line X1, formed to be able to separately accommodate the respective wires 3a, 3b, and 3c of the wire portion 2, and disposed at equal intervals along the circumferential direction around the central axial line X1 on the cross section viewed from the axial direction along the central axial line X1 as illustrated in FIG. 7, and the space portion 23 formed by penetrating the main body portion 21 along the central axial line X1 between two wire housing portions adjacent to each other along the circumferential direction among the plurality of wire housing portions 22a, 22b, and 22c.

According to this configuration, the space portion 23 is interposed among the respective wire housing portions 22a, 22b, and 22c of the second wire holding member 20 along the circumferential direction at all times. Thus, it is possible to ensure a distance corresponding to a size in the circumferential direction of the space portion 23 among the respective wires of the wire portion 2 by accommodating the respective wires 3a, 3b, and 3c of the wire portion 2 in the respective wire housing portions 22a, 22b, and 22c of the second wire holding member 20. For this reason, distances among the respective wires 3a, 3b, and 3c of the wire portion 2 can be increased when compared to the conventional wire harness 101 (see FIG. 29). Thus, it is possible to reduce capacitances c among the respective wires 3a, 3b, and 3c of the wire portion 2, to suppress generation of noise of the respective wires 3a, 3b, and 3c, and to reduce influence of noise generated in another adjacent wire. In addition, when the space portion 23 is provided among the wire housing portions 22a, 22b, and 22c, an air space having a low dielectric constant may be provided among the respective wires 3a, 3b, and 3c accommodated in the wire housing portions 22a, 22b, and 22c. Thus, it is possible to further reduce the capacitances c among the respective wires 3a, 3b, and 3c. Therefore, the wire harness 1 of the present embodiment may sufficiently reduce radiated noise of the wire portion 2 by applying the second wire holding member 20 as the wire-side surge reducing means S1. As a result, it is possible to suitably suppress generation of a surge voltage.

In addition, the second wire holding member 20 can suitably maintain a proper positional relation of the respective wires 3a, 3b, and 3c of the wire portion 2 which can suitably suppress generation of a surge voltage as described above by accommodating the respective wires 3a, 3b, and 3c of the wire portion 2 in the wire housing portions 22a, 22b, and 22c. In this way, the second wire holding member 20 can sustain an effect of suppressing a surge voltage for a long period of time in the wire harness 1 in which the second wire holding member 20 is incorporated.

Further, in the second wire holding member 20, the wire housing portions 22a, 22b, and 22c are formed such that the visible outline of the wires 3a, 3b, and 3c accommodated in the wire housing portions 22a, 22b, and 22c touches the visible outline of the cylindrical shape of the main body portion 21 (visible outline of the outer circumferential surface 21a) from the inner circumference side on the axial cross section illustrated in FIG. 7.

According to this configuration, the respective wires 3a, 3b, and 3c accommodated in the wire housing portions 22a, 22b, and 22c can be disposed to be spaced apart as much as possible in the outer circumferential direction from the central axial line X1 within a range of a constraint on the cylindrical shape of the main body portion 21. Thus, it is possible to increase distances in the circumferential direction among the respective wires 3a, 3b, and 3c of the wire portion 2 as much as possible. In this way, it is possible to further reduce the capacitances c among the respective wires 3a, 3b, and 3c of the wire portion 2, and to further suppress generation of a surge voltage.

In addition, when the respective wires 3a, 3b, and 3c of the wire portion 2 are accommodated in the respective wire housing portions 22a, 22b, and 22c of the second wire holding member 20, the wires 3a, 3b, and 3c do not protrude from the outer circumferential surface 21a of the main body portion 21 of the second wire holding member 20. Thus, the tape 26 may be easily wound around the outer circumferential surface 21a. The wires 3a, 3b, and 3c accommodated in the wire housing portions 22a, 22b, and 22c may protrude to the outer circumferential side from the outer circumferential surface 21a of the main body portion 21 by a degree at which the wires 3a, 3b, and 3c do not protrude from the outer edge portion 24.

Further, in the second wire holding member 20, the wire housing portions 22a, 22b, and 22c are formed such that the wires 3a, 3b, and 3c can be fit into the wire housing portions 22a, 22b, and 22c from the outer circumferential side of the main body portion 21. That is, the wire housing portions 22a, 22b, and 22c may allow the wires 3a, 3b, and 3c to be fit into the wire housing portions 22a, 22b, and 22c from the openings 25a, 25b, and 25c provided on the outer circumferential surface 21a of the main body portion 21. According to this configuration, it is possible to easily accommodate the wires 3a, 3b, and 3c in the wire housing portions 22a, 22b, and 22c, and to enhance working property when the wire portion 2 is assembled into the second wire holding member 20.

Furthermore, in the second wire holding member 20, the space portion 23 is formed in an integrated manner from between two wire housing portions adjacent to each other along the circumferential direction among the plurality of wire housing portions 22a, 22b, and 22c up to the central axial line X1 on the axial cross section illustrated in FIG. 7.

According to this configuration, a larger air space may be provided among the respective wires 3a, 3b, and 3c accommodated in the wire housing portions 22a, 22b, and 22c. Thus, it is possible to further reduce the capacitances c among the respective wires 3a, 3b, and 3c. In addition, the main body portion 21 of the second wire holding member 20 has a hollow shape, and thus may be flexibly deformed in response to an external force. Therefore, impact absorption can be improved.

In addition, the second wire holding member 20 includes the outer edge portion 24 which is erected from the outer circumferential surface 21a of the cylindrical shape of the main body portion 21 and is formed to extend along the circumferential direction. According to this configuration, when the braided wire 6 and the corrugated tube 7 are wrapped around the second wire holding member 20, the outer edge portion 24 abuts against the braided wire 6 and the corrugated tube 7 from the inner circumference side, and thus the external shape of the corrugated tube 7 can be firmly maintained in a circular shape along an external shape of the outer edge portion 24.

Further, in the wire harness 1 according to the present embodiment, the second wire holding member 20 is formed to surround the portion in the longitudinal direction of the wire portion 2, and the plurality of second wire holding members 20 is installed at predetermined intervals along the longitudinal direction of the wire portion 2. According to this configuration, a region in which the wire portion 2 is surrounded by the second wire holding members 20 can be narrowed to a portion in the longitudinal direction, and thus plasticity (property of being easily bent) of the wire portion 2 not surrounded by the second wire holding members 20 may be maintained. In this way, the wire harness 1 according to the present embodiment can favorably maintain plasticity of the wire portion 2 while exhibiting an effect of reducing a surge voltage by installation of the second wire holding members 20.

As illustrated in FIG. 8, the above embodiment illustrates an example of a configuration in which the wire harness 1 includes the plurality of second wire holding members 20 and each of the second wire holding members 20 is formed to surround a portion in the longitudinal direction of the wire portion 2. However, a configuration of the second wire holding members 20 is not limited thereto. For example, it is possible to employ a configuration in which the wire harness 1 includes a single second wire holding member 20 and this second wire holding member 20 surrounds a whole area in the longitudinal direction of the wire portion 2. According to this configuration, a region in which the second wire holding member 20 touches the wire portion 2 can increase. Thus, it is possible to more firmly maintain arrangement of the respective wires 3a, 3b, and 3c of the wire portion 2 which can suitably suppress generation of a surge voltage, and to sustain an effect of suppressing a surge voltage of the wire harness 1 for a long period of time.

In addition, the above embodiment illustrates an example of a configuration in which the wires 3a, 3b, and 3c are fit into the respective wire housing portions 22a, 22b, and 22c of the second wire holding member 20 from the openings 25a, 25b, and 25c provided on the outer circumferential surface 21a of the main body portion 21. However, a configuration in which the openings 25a, 25b, and 25c are not provided may be employed. In this case, the wire housing portions 22a, 22b, and 22c have shapes of circular holes, and have shapes that open on both end surfaces in the axial direction of the main body portion 21.

Connector-side Surge Reducing Means S2

The connector-side surge reducing means S2 is a surge reducing means provided in the connectors 8 and 9 among components of the wire harness 1. The wire harness 1 of the present embodiment can selectively apply the connector-side surge reducing means S2 to achieve a desired decreasing amount of a surge voltage according to a harness length. In the present embodiment, the connector-side surge reducing means S2 specifically refers to a magnetic material 38 provided in the connectors 8 and 9.

Figure 10:
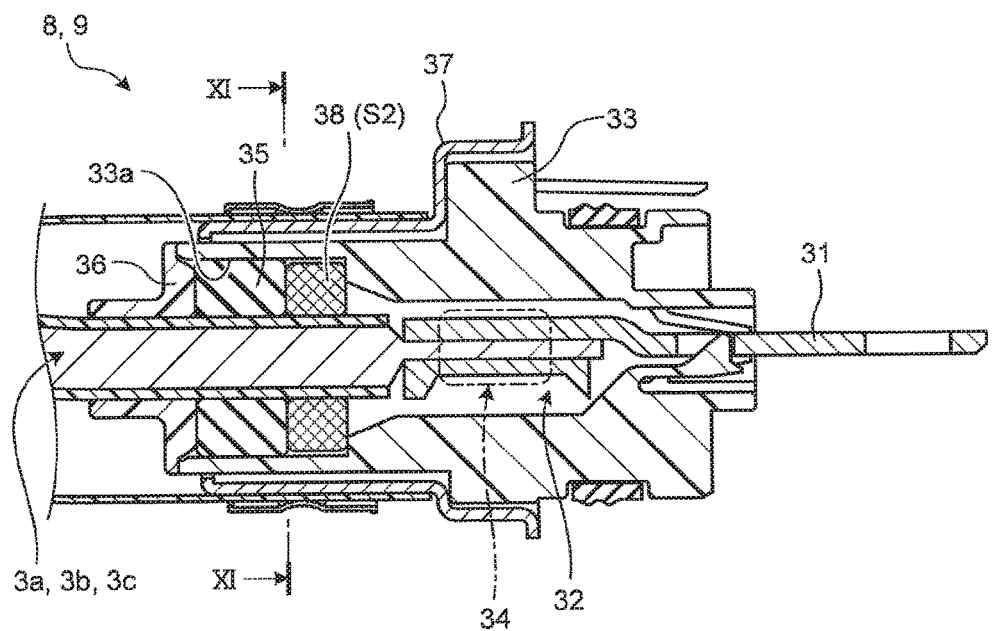
FIG. 10 is a vertical sectional view of a connector of FIG. 2.
Figure 11:
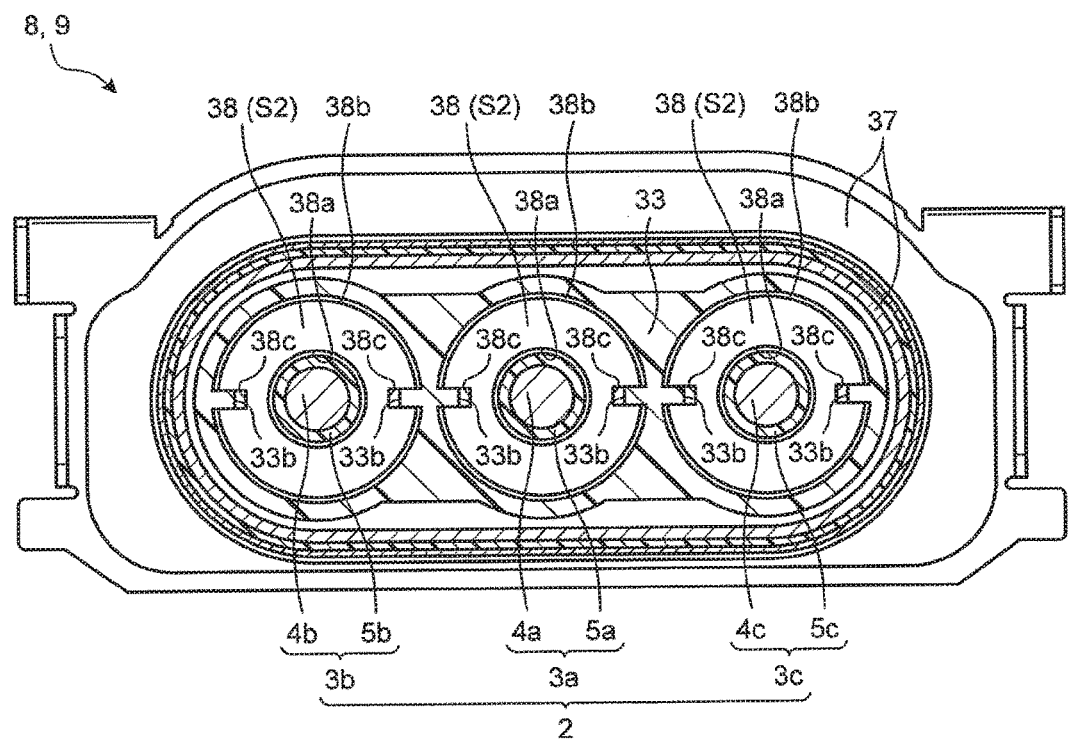
FIG. 11 is a cross-sectional view taken along the line XI-XI of FIG. 10.
Figure 12:
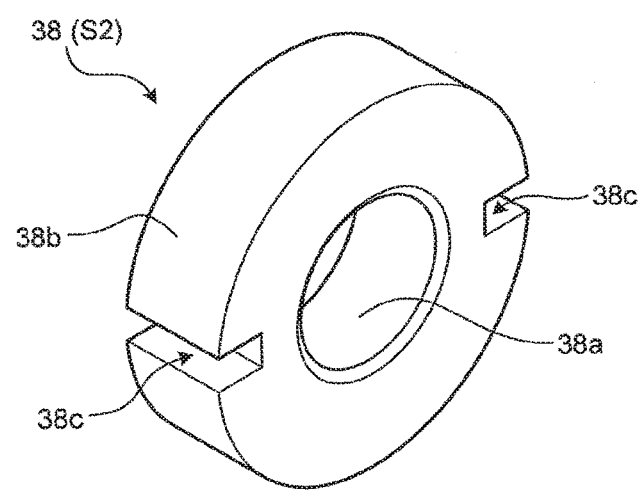
FIG. 12 is a perspective view of a magnetic material (ferrite core) of FIGS. 10 and 11.

Herein, a description will be given of a configuration of the connectors 8 and 9 and a configuration of the magnetic material 38 serving as the connector-side surge reducing means S2 with reference to FIGS. 10 to 12. FIG. 10 is a vertical sectional view of a connector of FIG. 2. FIG. 11 is a cross-sectional view taken along the line XI-XI of FIG. 10. FIG. 12 is a perspective view of the magnetic material (ferrite core) of FIGS. 10 and 11. Both the connectors 8 and 9 have the same configuration, and thus will be collectively described with reference to FIGS. 10 to 12.

As illustrated in FIG. 10, each of the connectors 8 and 9 includes terminals 31 and a housing 33 (casing) in which a housing chamber 32 for accommodating the terminals 31 is formed. For example, the terminals 31 are terminal metal fittings corresponding to a conductive metal material formed in a predetermined male shape. The terminals 31 are prepared according to the number of wires 3a, 3b, and 3c of the wire portion 2. In the present embodiment, three terminals for three-phase high-voltage cables are accommodated in the housing chamber 32. Connections 34 between the terminals 31 and the wires 3a, 3b, and 3c are accommodated in the housing chamber 32. A distal end portion of each of the terminals 31 is installed to protrude to an outside of the housing 33 from inside the housing chamber 32 on an opposite side to the wire portion 2 along the central axial line X1. The housing 33 that forms the housing chamber 32 is molded using an insulating polymer material such as synthetic resin.

The housing 33 is provided with an opening 33a on an opposite side to the terminals 31, and the wires 3a, 3b, and 3c are inserted into the housing 33 from the opening 33a. Each of the connectors 8 and 9 includes packing 35 and a rear holder 36 (casing). The opening 33a of the housing 33 is sealed by the packing 35, and the rear holder 36 is fixed thereto. For example, the packing 35 is formed in a cylindrical shape to hold the wires 3a, 3b, and 3c inserted therein using an inner circumferential surface, and is held by an inner circumferential surface of the opening 33a on an outer circumferential surface. The packing 35 is formed by a polymer material having elasticity such as rubber (for example, hard rubber). The rear holder 36 has a hole portion similarly to the packing 35, and holds the wires 3a, 3b, and 3c inserted into the hole portion using an inner circumferential surface of the hole portion. Similarly to the housing 33, the rear holder 36 is molded using an insulating polymer material such as synthetic resin. Referring to the rear holder 36, a portion fit into the opening 33a comes into contact with an end surface of the packing 35, and an external portion of the opening 33a comes into contact with an end surface of the housing 33.

In addition, each of the connectors 8 and 9 includes a shell 37 that wraps the housing 33. The shell 37 is formed to surround the housing 33 on an outer circumferential side of the housing 33 around the central axial line X1, thereby protecting the connector. For example, the shell 37 is molded using a metal material having a high rigidity.

As illustrated in FIGS. 10 and 11, each of the connectors 8 and 9 includes the magnetic material 38 for reducing noise of the wires 3a, 3b, and 3c accommodated therein. The magnetic material 38 is installed to be adjacent to the packing 35 inside the housing chamber 32 of the housing 33 as illustrated in FIG. 10, and is installed to surround the outer circumferential sides of the wires 3a, 3b, and 3c as illustrated in FIG. 11. As illustrated in FIGS. 11 and 12, the magnetic material 38 is formed in an annular shape, and the wires 3a, 3b, and 3c are inserted into a hole portion 38a. For example, the magnetic material 38 corresponds to a ferrite core. When the wires 3a, 3b, and 3c pass through the annular magnetic material 38, a magnetic flux is generated in the magnetic material 38, and current energy is converted into magnetic energy. Then, on the verge of reverting to current energy again due to electromagnetic induction, magnetic loss occurs, and a part of a noise current is suppressed. In this way, noise of the wires 3a, 3b, and 3c can be reduced by surrounding the outer circumferential sides of the wires 3a, 3b, and 3c with the annular magnetic material 38.

The magnetic material 38 is prepared according to the number of wires 3a, 3b, and 3c of the wire portion 2. In the present embodiment, three magnetic materials 38 corresponding to the three wires 3a, 3b, and 3c of the wire portion 2 are accommodated in the housing chamber 32. The three respective magnetic materials 38 are separately installed in the respective wires 3a, 3b, and 3c of the wire portion 2. In general, arrangement of the magnetic materials 38 and the wires 3a, 3b, and 3c is referred to as a normal mode.

In addition, the magnetic material 38 is provided with notches 38c (recesses) on an annular outer circumferential surface 38b. As illustrated in FIG. 12, the notches 38c are formed to dig from the outer circumferential surface 38b to an axial center side, and continuously extend between both end surfaces along an axial direction. In general, the notches 38c are provided for suppressing flux saturation in order to leak a magnetic flux inside the magnetic material 38 to suppress flux saturation. The present embodiment illustrates an example of a configuration in which two notches 38c are provided in the magnetic material 38 at opposite positions around an axial center. However, the number of notches 38c is not limited thereto.

Meanwhile, as illustrated in FIG. 11, ribs 33b (projections) fit into the notches 38c of the magnetic material 38, which is previously installed inside the housing 33, are provided in a portion coming into contact with the outer circumferential surface 38b of the magnetic material 38 at the time of installing the magnetic material 38 on an inner circumferential surface of the housing 33.

In this way, each of the connectors 8 and 9 serving as a wire housing member according to the present embodiment includes the housing 33 in which the wires 3a, 3b, and 3c are accommodated, the magnetic material 38 formed in an annular shape and installed to surround the outer circumferential sides of the wires 3a, 3b, and 3c inside the housing 33, the notches 38c provided on the outer circumferential surface 38b of the magnetic material 38 to serve as recesses, and the ribs 33b provided inside the housing 33 to serve as projections. When the magnetic material 38 is installed inside the housing 33, the ribs 33b of the housing 33 are fit into the notches 38c of the magnetic material 38. In addition, the wire harness 1 according to the present embodiment includes the wires 3a, 3b, and 3c and the connectors 8 and 9 connected to both end portions of the wires 3a, 3b, and 3c to serve as wire housing members.

According to this configuration, the magnetic material 38 may be suitably held inside the housing chamber 32 of each of the connectors 8 and 9 by previously fitting the ribs 33b of the housing 33 into the notches 38c of the magnetic material 38 when the magnetic material 38 is incorporated in each of the connectors 8 and 9 to suppress noise of the wires 3a, 3b, and 3c. In this way, for example, even when vibration or the like is generated, it is possible to prevent the magnetic material 38 from rotating or interfering with a component around the magnetic material 38. Thus, it is possible to suppress wear of the magnetic material 38 such as peeling of a coating material. When wear of the magnetic material 38 is suppressed, it is possible to sustain an effect of reducing noise of a wire by the magnetic material 38 for a long period of time.

In addition, in the connectors 8 and 9 of the present embodiment, the notches 38c conventionally provided in the magnetic material 38 to suppress flux saturation are used as elements fit to the ribs 33b of the housing 33 when the magnetic material 38 is installed inside the connectors 8 and 9. In this way, an engagement element for holding the magnetic material 38 inside the housing chamber 32 may not be newly provided when the magnetic material 38 is incorporated in the connectors 8 and 9. Thus, it is possible to suppress wear of the magnetic material 38 while reducing manufacturing costs.

Further, in connectors 8 and 9 of the present embodiment, the housing 33 accommodates the plurality of wires 3a, 3b, and 3c therein, and the magnetic material 38 is separately installed in each of the plurality of wires 3a, 3b, and 3c. According to this configuration, noise can be eliminated by the so-called normal mode. In addition, when the magnetic material 38 is separately installed in each phase of the three-phase wire, an inductance of each of the wires 3a, 3b, and 3c can be changed (increased) to shift resonance points among the respective wires 3a, 3b, and 3c. Further, a property of the magnetic material 38 can be separately selected for each of the wires 3a, 3b, and 3c according to a frequency of a surge voltage such that only a frequency component of the surge voltage can be removed from noise of each of the wires 3a, 3b, and 3c. Thus, it is possible to efficiently suppress a surge voltage of the wire harness 1.

The above embodiment illustrates an example of a configuration for providing the projections (ribs 33b), to which the notches 38c of the magnetic material 38 are fit, in the housing 33 of the connectors 8 and 9 when the magnetic material 38 is installed inside the connectors 8 and 9. However, for example, the projections can be provided in another case such as the rear holder 36 in addition to the housing 33 if the notches 38c of the magnetic material 38 may be fit when the magnetic material 38 is installed inside the connectors 8 and 9. In addition, it is possible to employ a configuration in which the magnetic material 38 is installed inside the housing 33 at a different position from an installation position illustrated FIGS. 10 and 11.

Further, the above embodiment illustrates an example of a configuration of a noise reduction scheme using the so-called normal mode in which the magnetic material 38 is separately installed in each of the plurality of wires 3a, 3b, and 3c accommodated in the connectors 8 and 9. However, instead, it is possible to employ a configuration of a noise reduction scheme using a so-called common mode in which a single magnetic material is installed to collectively surround the outer circumferential sides in which the plurality of wires 3a, 3b, and 3c is arranged.

Furthermore, the above embodiment illustrates an example of a configuration in which the magnetic material 38 is installed to surround the outer circumferential sides of the wires 3a, 3b, and 3c inside the connectors 8 and 9. However, it is possible to employ a configuration in which the magnetic material 38 is installed to surround an outer circumferential side of a conductor (for example, a bus bar and a terminal) connected to the wires 3a, 3b, and 3c.

In the present embodiment, the magnetic material 38, which is provided inside the connectors 8 and 9 and is formed in the annular shape to surround the outer circumferential sides of the respective wires 3a, 3b, and 3c of the wire portion 2, is given as an example of the connector-side surge reducing means S2. However, it is preferable when a surge voltage of the wire portion 2 may be reduced inside the connectors 8 and 9. For example, it is possible to apply another member such as a protective circuit or an air-core coil in addition to the magnetic material 38.

Middle Portion-side Surge Reducing Means S3

The middle portion-side surge reducing means S3 is a surge reducing means provided in the middle portion 40 among components of the wire harness 1. The wire harness 1 of the present embodiment may selectively apply the middle portion-side surge reducing means S3 to achieve a desired decreasing amount of a surge voltage according to a harness length. Specifically, the middle portion-side surge reducing means S3 refers to a magnetic material 42 provided inside the middle portion 40.

As illustrated in FIG. 2, the middle portion 40 includes an outline portion 41 (casing) and the magnetic material 42. The outline portion 41 has openings at both ends in the axial direction along the central axial line X1, and is connected to the corrugated tube 7 by each of the openings. The respective wires 3a, 3b, and 3c of the wire portion 2 are inserted into the outline portion 41 through the openings. The magnetic material 42 is an annular member, and is incorporated in the outline portion 41. For example, the magnetic material 42 corresponds to a ferrite core. When the wires 3a, 3b, and 3c are allowed to pass through the annular magnetic material 42, noise of the wires 3a, 3b, and 3c can be reduced similarly to the magnetic material 38 inside the connectors 8 and 9 described above.

The magnetic material 42 is installed to collectively surround the respective wires 3a, 3b, and 3c of the wire portion 2 inserted into the outline portion 41 along the circumferential direction around the central axial line X1. That is, in the middle portion 40, the three wires 3a, 3b, and 3c of the wire portion 2 are collectively inserted into a through-hole in the middle of the annular magnetic material 42. In general, arrangement of the magnetic material 42 and the wires 3a, 3b, and 3c is referred to as a common mode. In the common mode, noise of the respective wires 3a, 3b, and 3c of the wire portion 2 can be reduced by the single magnetic material 42.

The present embodiment illustrates an example of a configuration in which the magnetic material 42 is installed to surround the outer circumferential sides of the wires 3a, 3b, and 3c inside the middle portion 40. However, it is possible to employ a configuration in which the magnetic material 42 is installed to surround an outer circumferential side of a conductor (for example, a bus bar and a terminal) connected to the wires 3a, 3b, and 3c.

In addition, in the present embodiment, the magnetic material 42, which is provided inside the middle portion 40 and is formed in an annular shape to surround the outer circumferential sides of the respective wires 3a, 3b, and 3c of the wire portion 2, is given as an example of the middle portion-side surge reducing means S3. However, it is preferable when a surge voltage of the wire portion 2 may be reduced inside the middle portion 40. For example, it is possible to apply another member such as a protective circuit or an air-core coil in addition to the magnetic material 42.

Modified Example of the Middle Portion-side Surge Reducing Means S3

Figure 13:
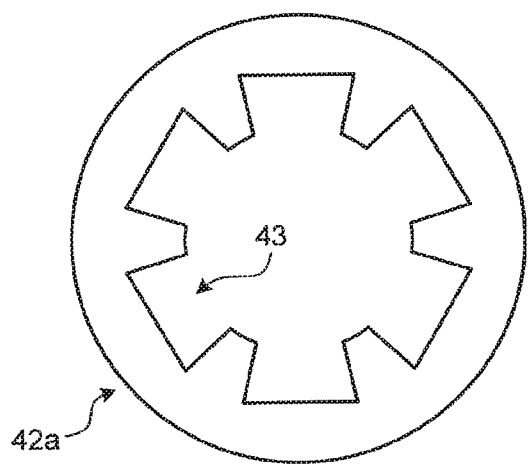
FIG. 13 is a plan view illustrating one aspect of a first modified example of a magnetic material of a middle portion serving as a middle portion-side surge reducing means.
Figure 14:
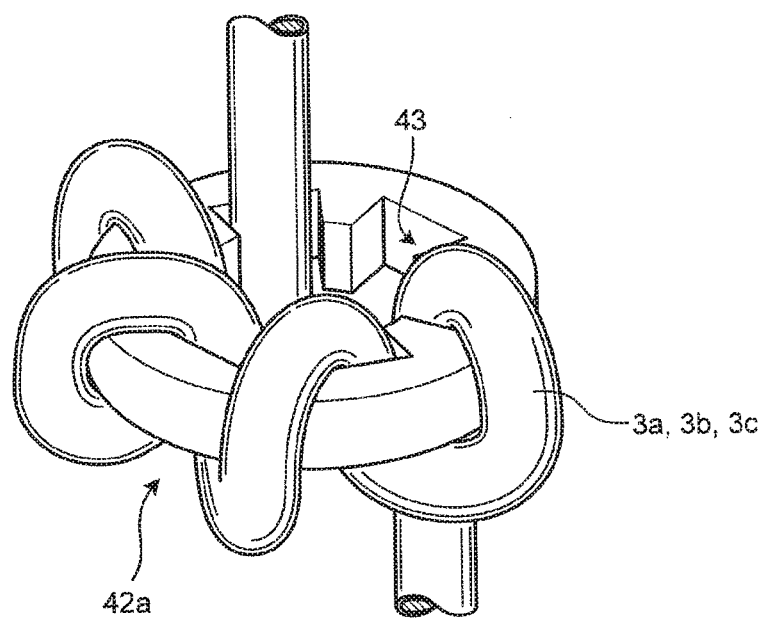
FIG. 14 is a perspective view illustrating a state in which wires are wound around the magnetic body illustrated in FIG. 13.
Figure 15:
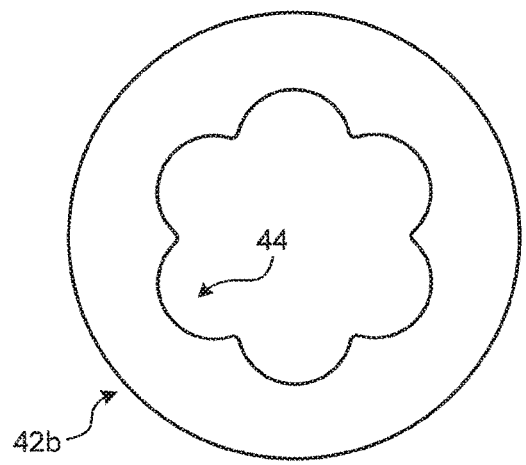
FIG. 15 is a plan view illustrating another aspect of a shape of an inner circumferential surface of the magnetic body illustrated in FIG. 13.

A description will be given of a first modified example of the middle portion-side surge reducing means S3 (magnetic material 42) with reference to FIGS. 13 to 15. FIG. 13 is a plan view illustrating one aspect of the first modified example of the magnetic material of the middle portion serving as the middle portion-side surge reducing means. FIG. 14 is a perspective view illustrating a state in which the wires are wound around the magnetic body illustrated in FIG. 13. FIG. 15 is a plan view illustrating another aspect of a shape of an inner circumferential surface of the magnetic body illustrated in FIG. 13.

In the above embodiment, as illustrated in FIG. 2, the respective wires 3a, 3b, and 3c of the wire portion 2 are inserted into the hole portion in the middle of the annular shape in the magnetic material 42 of the middle portion 40 serving as the middle portion-side surge reducing means S3. On the other hand, as in the first modified example illustrated in FIGS. 13 to 15, the wires 3a, 3b, and 3c are inserted into a hole portion of a magnetic material 42a a plurality number of times by winding the wires 3a, 3b, and 3c around an annular portion of each of magnetic materials 42a and 42b (ferrite cores). In this way, it is possible to obtain a configuration for enhancing an effect of reducing surge.

As illustrated in FIG. 13, in the magnetic material 42a of the first modified example, a dovetail groove 43 is provided on an inner circumferential surface of the hole portion. When the wires 3a, 3b, and 3c are wound around the magnetic material 42a, the respective wires 3a, 3b, and 3c are press-fitted to the dovetail groove 43 as illustrated in FIG. 14. In this way, the wires 3a, 3b, and 3c wound around the magnetic material 42a can be fixed without intersecting one another, and an air gap can be prevented from being generated between the wires 3a, 3b, and 3c and the magnetic material 42a. Since any air gap is not generated, a magnetic flux does not leak, and an inductance does not decrease. Thus, it is possible to enhance performance of noise reduction effect of the magnetic material 42a. In addition, the wires 3a, 3b, and 3c wound around the magnetic material 42a can be prevented from loosening. Further, a separate component may not be prepared to prevent looseness of the wires, and thus costs can be reduced.

A groove portion provided on an inner circumferential surface of the magnetic material 42a may have a shape other than a shape of the dovetail groove 43 illustrated in FIGS. 13 and 14. For example, as in the magnetic material 42b illustrated in FIG. 15, a groove portion 44 having a shape that imitates an external shape of a cross section perpendicular to the axial direction of the wires 3a, 3b, and 3c may be provided on the inner circumferential surface of the hole portion.

Figure 16:
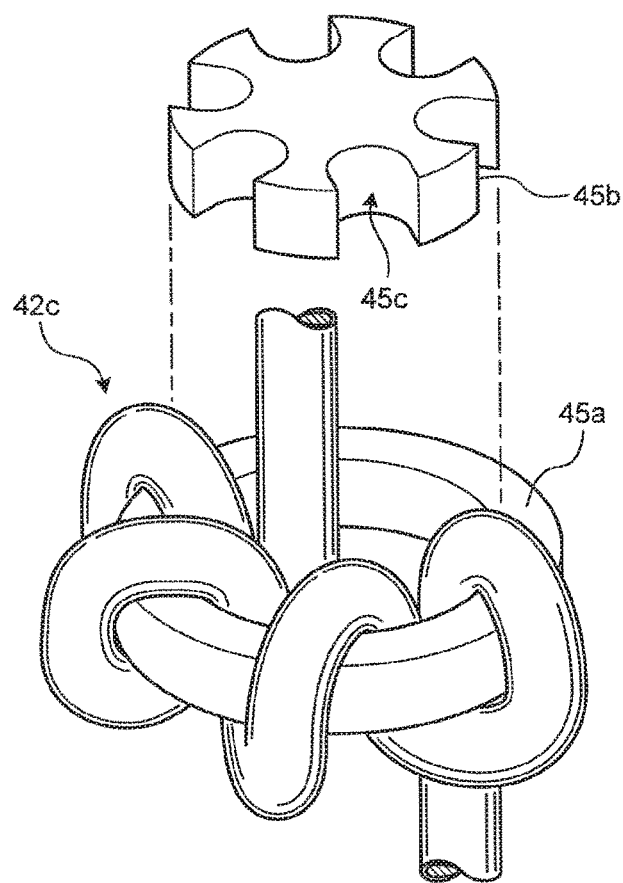
FIG. 16 is a perspective view illustrating a second modified example of the magnetic material of the middle portion serving as the middle portion-side surge reducing means.
Figure 17:
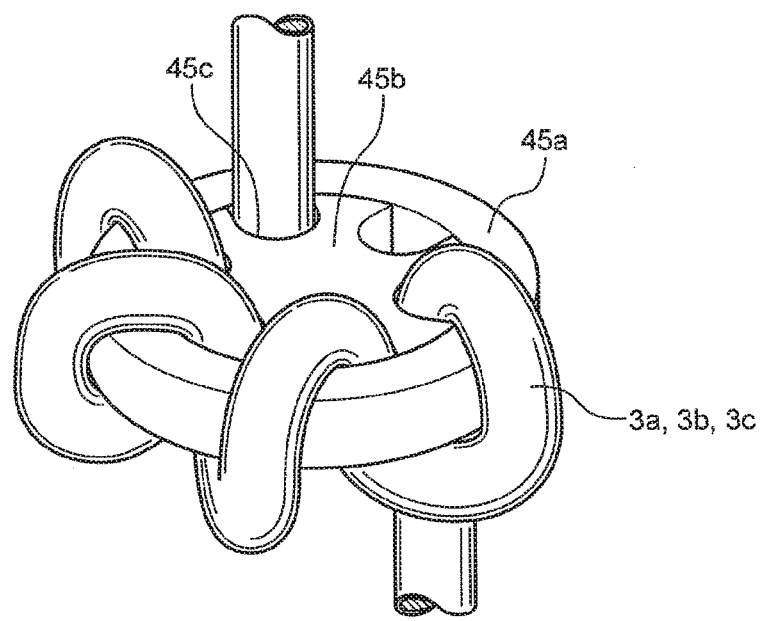
FIG. 17 is a perspective view of the magnetic material according to the second modified example illustrating a state in which a holder portion illustrated in FIG. 16 is press-fitted to a main body portion.

A description will be given of a second modified example of the middle portion-side surge reducing means S3 (magnetic material 42) with reference to FIGS. 16 and 17. FIG. 16 is a perspective view illustrating the second modified example of the magnetic material of the middle portion serving as the middle portion-side surge reducing means. FIG. 17 is a perspective view of the magnetic material according to the second modified example illustrating a state in which a holder portion illustrated in FIG. 16 is press-fitted to the main body portion.

Similarly to the first modified example, a magnetic material 42c of the second modified example illustrated in FIGS. 16 and 17 corresponds to a configuration for suitably fixing the wires 3a, 3b, and 3c and preventing looseness thereof when the wires 3a, 3b, and 3c are wound around the magnetic material 42a. As illustrated FIG. 16, the magnetic material 42c includes an annular main body portion 45a having the same shape as that of the magnetic material 42 of the embodiment, and a holder portion 45b that can be fit into a hole portion of the main body portion 45a. A groove portion 45c having a shape that imitates the external shape of the cross section perpendicular to the axial direction of the wires 3a, 3b, and 3c is provided on an outer circumferential surface of the holder portion 45b coming into contact with an inner circumferential surface of the main body portion 45a at the time of fitting.

In a state in which the wires 3a, 3b, and 3c are wound around the main body portion 45a, as illustrated in FIG. 17, the magnetic material 42c of the second modified example press-fits the holder portion 45b into the hole portion of the main body portion 45a, and fits the wires 3a, 3b, and 3c into the groove portion 45c. In this way, the wires 3a, 3b, and 3c wound around the magnetic material 42c can be fixed without intersecting one another, and an air gap can be prevented from being generated between the wires 3a, 3b, and 3c and the magnetic material 42c. In addition, the wires 3a, 3b, and 3c wound around the magnetic material 42c may be prevented from loosening. Further, when a specification of the wires 3a, 3b, and 3c is changed, it is possible to cope with the change by merely changing a shape of the holder portion 45b. In addition, there is no need to newly provide the main body portion 45a (similarly to the existing ferrite core), and this can reduce costs.

Incidentally, in the above embodiment, as illustrated in FIG. 2, the magnetic material 42 of the middle portion 40 serving as the middle portion-side surge reducing means S3 has a configuration for collectively surrounding the respective wires 3a, 3b, and 3c of the wire portion 2, that is, a configuration of a noise reduction scheme using the common mode. However, instead, similarly to the magnetic material 38 inside the above-described connectors 8 and 9, it is possible to apply a configuration of a noise reduction scheme using the so-called normal mode in which the magnetic material 42 is separately installed in each of the plurality of wires 3a, 3b, and 3c inserted into the outline portion 41. A third modified example and a fourth modified example below are given with regard to the configuration of the normal mode.

Figure 18:
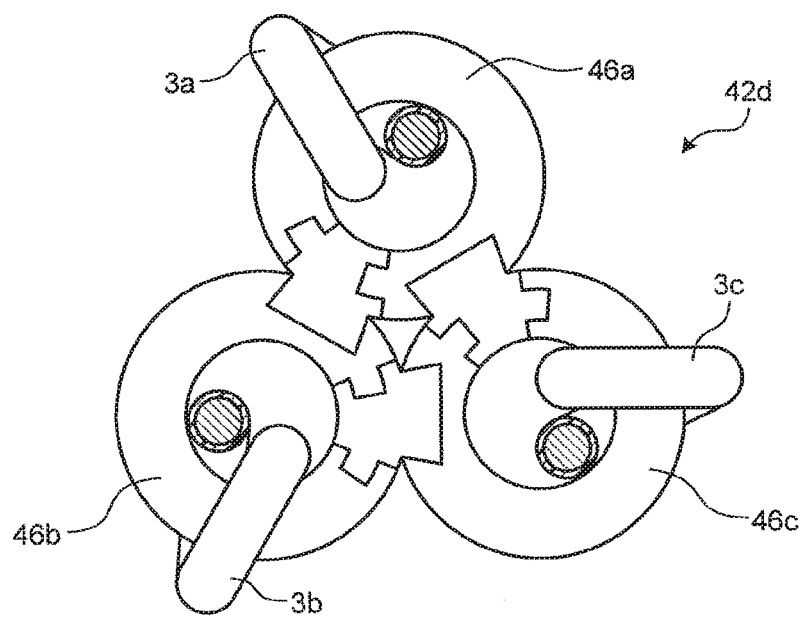
FIG. 18 is a front view illustrating a third modified example of the magnetic material of the middle portion serving as the middle portion-side surge reducing means.
Figure 19:
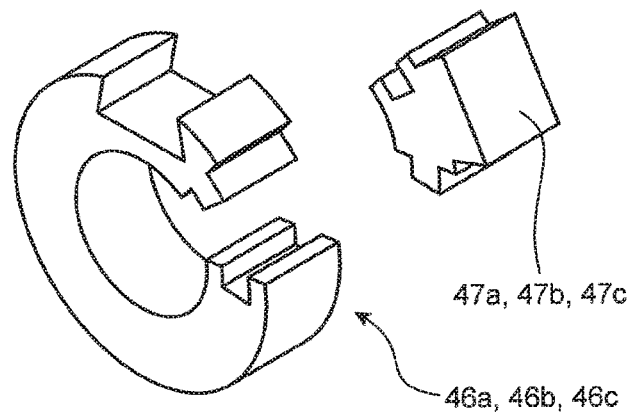
FIG. 19 is a perspective view illustrating a first step of an assembling process of the magnetic material according to the third modified example.
Figure 20:
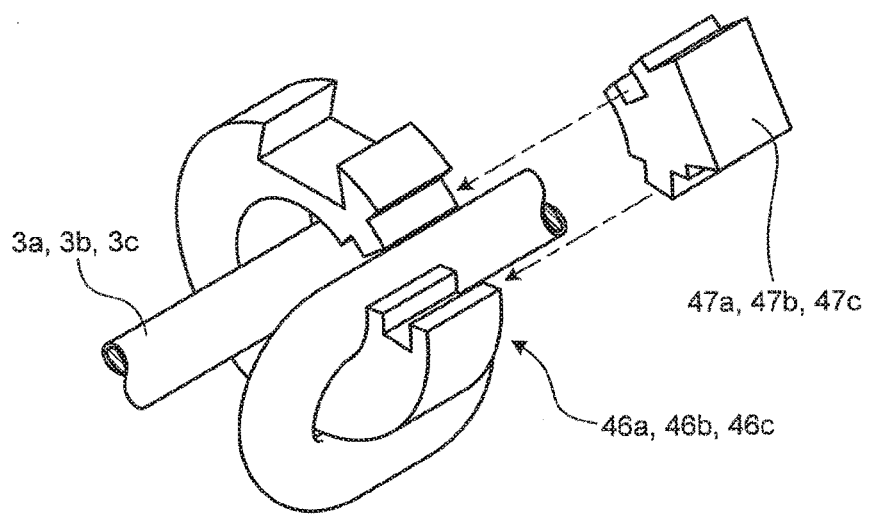
FIG. 20 is a perspective view illustrating a second step of the assembling process of the magnetic material according to the third modified example.
Figure 23:
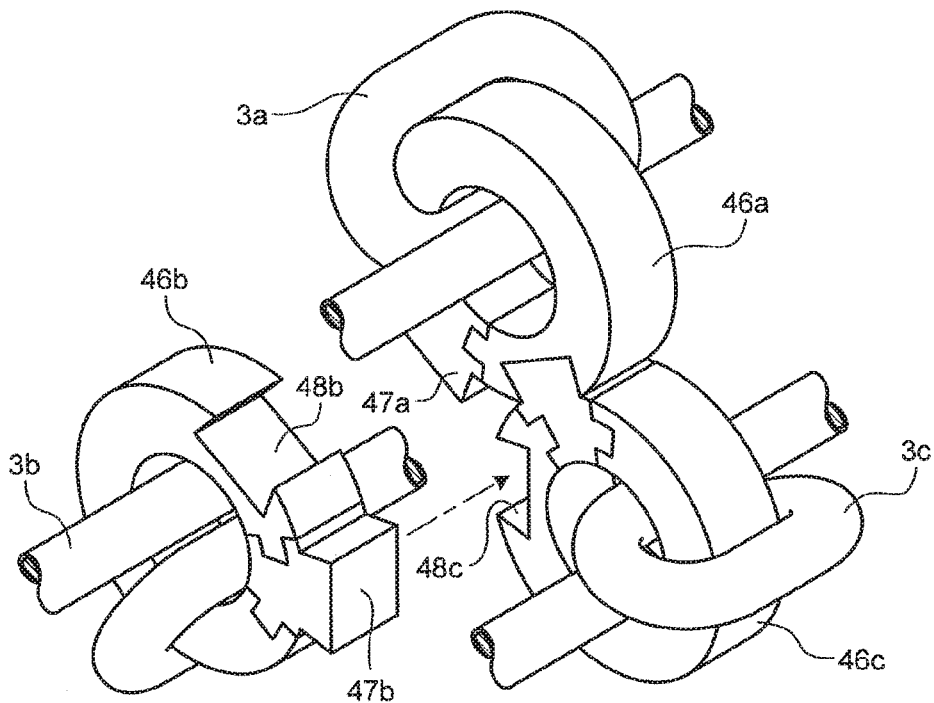
FIG. 23 is a perspective view illustrating a fifth step of the assembling process of the magnetic material according to the third modified example.
Figure 24:
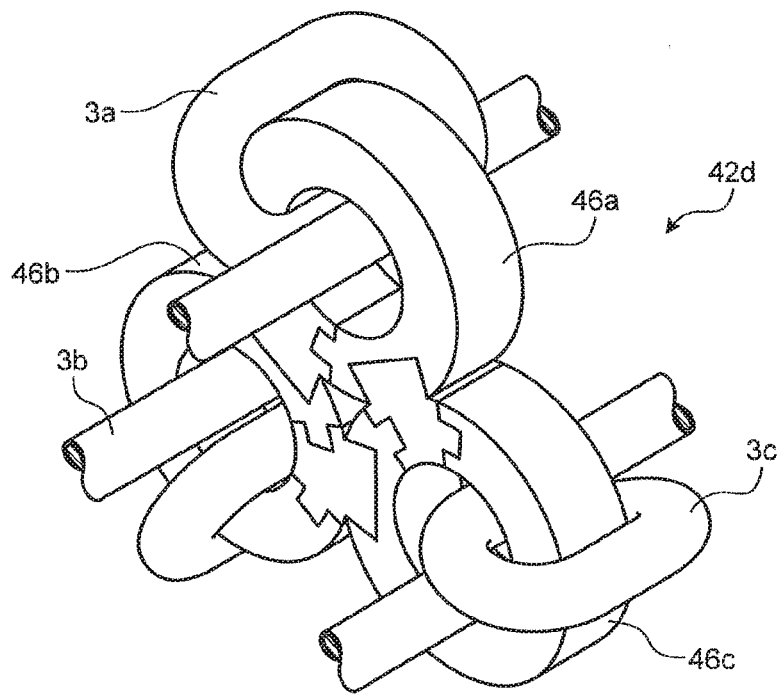
FIG. 24 is a perspective view illustrating a sixth step of the assembling process of the magnetic material according to the third modified example.

The third modified example of the middle portion-side surge reducing means S3 (magnetic material 42) will be described with reference to FIGS. 18 to 24. FIG. 18 is a front view illustrating the third modified example of the magnetic material of the middle portion serving as the middle portion-side surge reducing means. FIG. 19 is a perspective view illustrating a first step of an assembling process of the magnetic material according to the third modified example. FIG. 20 is a perspective view illustrating a second step of the assembling process of the magnetic material according to the third modified example. FIG. 21 is a perspective view illustrating a third step of the assembling process of the magnetic material according to the third modified example. FIG. 22 is a perspective view illustrating a fourth step of the assembling process of the magnetic material according to the third modified example. FIG. 23 is a perspective view illustrating a fifth step of the assembling process of the magnetic material according to the third modified example. FIG. 24 is a perspective view illustrating a sixth step of the assembling process of the magnetic material according to the third modified example.

As illustrated in FIG. 18, a magnetic material 42d of the third modified example includes a plurality of ferrite cores 46a, 46b, and 46c into which the respective wires 3a, 3b, and 3c are separately inserted. The respective ferrite cores 46a, 46b, and 46c are formed such that the wires 3a, 3b, and 3c may be wound around annular portions. In addition, the respective ferrite cores 46a, 46b, and 46c have structures allowing the ferrite cores 46a, 46b, and 46c to be connected (joined) to one another.

As illustrated in FIG. 19, connections 47a, 47b, and 47c corresponding to portions of annular shapes may be separated from the respective ferrite cores 46a, 46b, and 46c. As illustrated in FIG. 20, in the assembling process of the magnetic material 42d, the wires 3a, 3b, and 3c are wound around the ferrite cores 46a, 46b, and 46c in a state in which the connections 47a, 47b, and 47c are separated from the respective ferrite cores 46a, 46b, and 46c. In this instance, the portions of the annular shapes of the ferrite cores 46a, 46b, and 46c (connections 47a, 47b, and 47c) are missing, and thus the wires 3a, 3b, and 3c may be inserted into hole portions of the ferrite cores 46a, 46b, and 46c from the missing places. Thus, the wires 3a, 3b, and 3c may be easily wound around the ferrite cores 46a, 46b, and 46c. When winding of the wires 3a, 3b, and 3c finishes, as illustrated in FIGS. 20 and 21, the connections 47a, 47b, and 47c are slid and engaged with the ferrite cores 46a, 46b, and 46c.

In a state in which the connections 47a, 47b, and 47c are fit to the ferrite cores 46a, 46b, and 46c illustrated in FIG. 21, portions of the connections 47a, 47b, and 47c are formed to protrude from outer circumferential surfaces of the ferrite cores 46a, 46b, and 46c. The protruding portions of the connections 47a, 47b, and 47c function as portions engaged with other ferrite cores 46a, 46b, and 46c. In addition, engaged portions 48a, 48b, and 48c, with which the connections 47a, 47b, and 47c of other ferrite cores 46a, 46b, and 46c may be engaged, are provided on outer circumferential surfaces of the ferrite cores 46a, 46b, and 46c. The connection 47c of the ferrite core 46c is engaged with the engaged portion 48a of the ferrite core 46a as illustrated in FIG. 22, and the connection 47b of the ferrite core 46b is engaged with the engaged portion 48c of the ferrite core 46c as illustrated in FIG. 23. Consequently, when the connection 47a of the ferrite core 46a is engaged with the engaged portion 48b of the ferrite core 46b, the ferrite cores 46a, 46b, and 46c are assembled into an integrated magnetic material 42d as illustrated in FIG. 24. In this way, the magnetic material 42d of the third modified example has a structure allowing the plurality of ferrite cores 46a, 46b, and 46c to be connected (joined) to one another, and thus may not have another component for bundling the plurality of ferrite cores 46a, 46b, and 46c. Thus, it is possible to reduce costs and the number of parts. In addition, the plurality of ferrite cores 46a, 46b, and 46c can be arranged in an integrated manner, and thus it is possible to achieve space saving and miniaturization.

Figure 25:
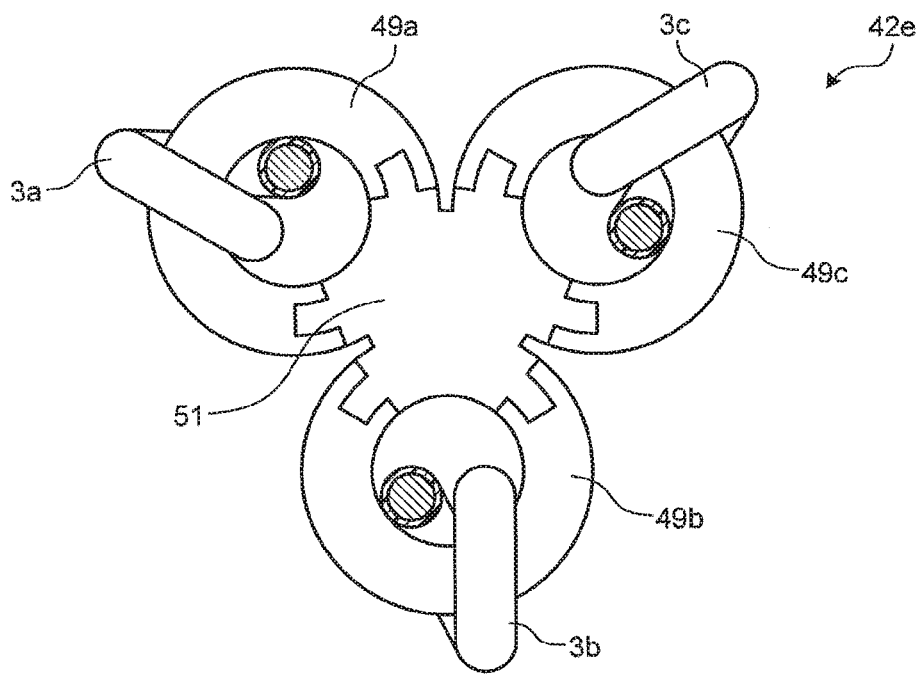
FIG. 25 is a front view illustrating a fourth modified example of the magnetic material of the middle portion serving as the middle portion-side surge reducing means.
Figure 26:
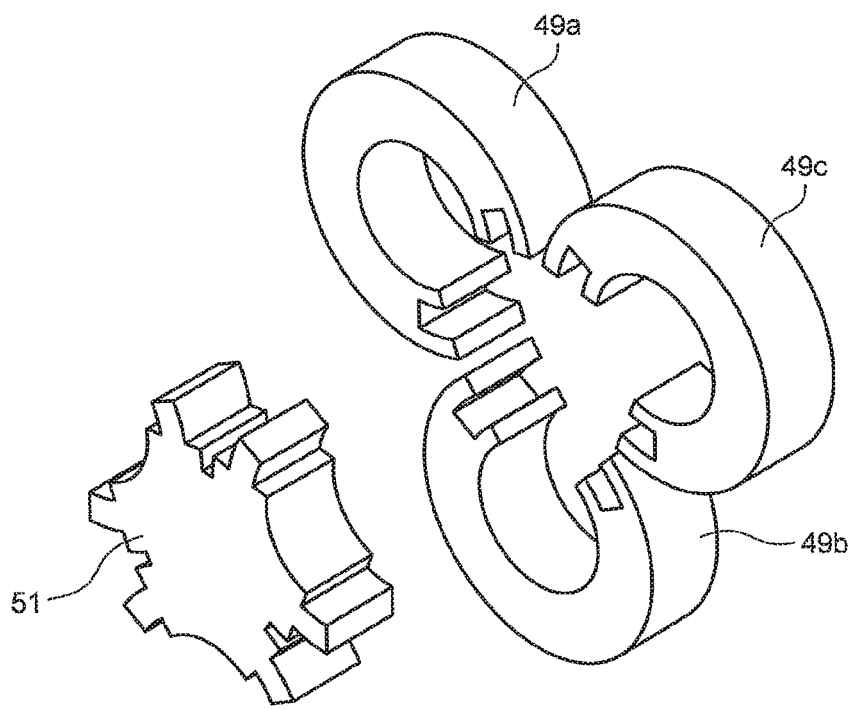
FIG. 26 is a perspective view illustrating a first step of an assembling process of the magnetic material according to the fourth modified example.
Figure 27:
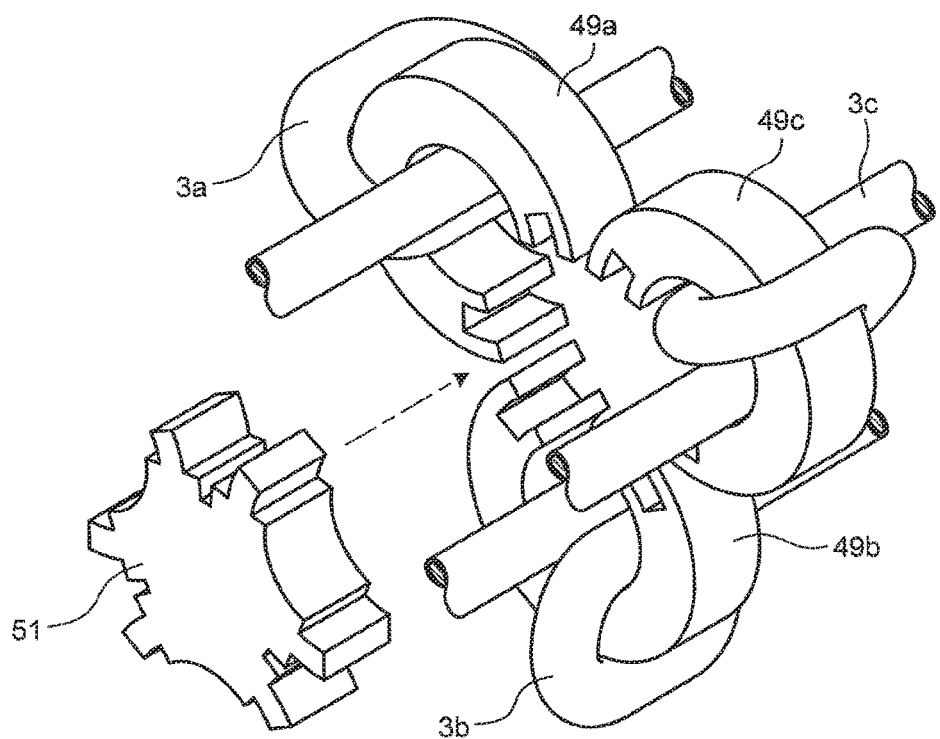
FIG. 27 is a perspective view illustrating a second step of the assembling process of the magnetic material according to the fourth modified example.
Figure 28:
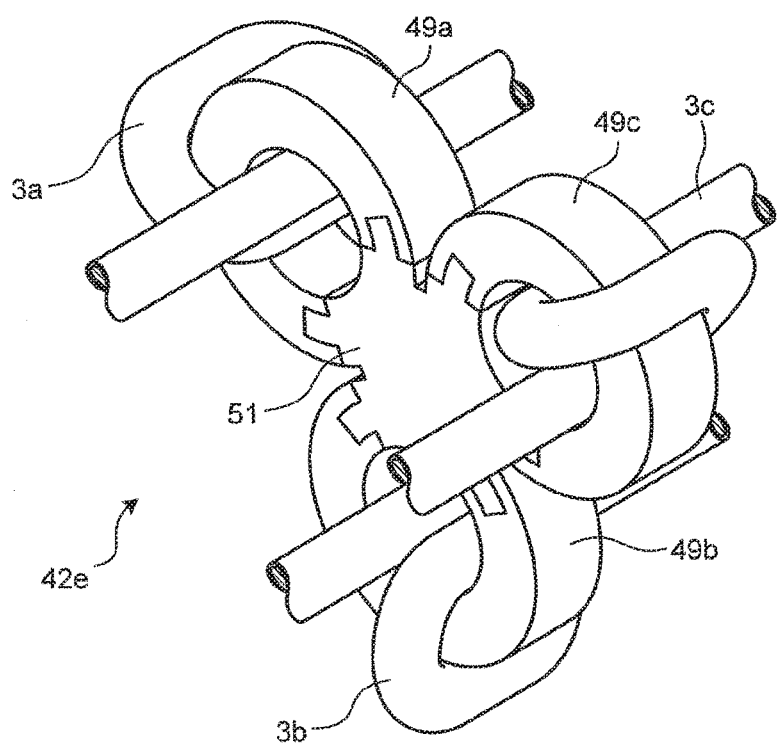
FIG. 28 is a perspective view illustrating a third step of the assembling process of the magnetic material according to the fourth modified example.

The fourth modified example of the middle portion-side surge reducing means S3 (magnetic material 42) will be described with reference to FIGS. 25 to 28. FIG. 25 is a front view illustrating the fourth modified example of the magnetic material of the middle portion serving as the middle portion-side surge reducing means. FIG. 26 is a perspective view illustrating a first step of an assembling process of the magnetic material according to the fourth modified example. FIG. 27 is a perspective view illustrating a second step of the assembling process of the magnetic material according to the fourth modified example. FIG. 28 is a perspective view illustrating a third step of the assembling process of the magnetic material according to the fourth modified example.

As illustrated in FIG. 25, a magnetic material 42e of the fourth modified example includes a plurality of ferrite cores 49a, 49b, and 49c into which the respective wires 3a, 3b, and 3c are separately inserted. The respective ferrite cores 49a, 49b, and 49c are formed such that the wires 3a, 3b, and 3c may be wound around annular portions.

As illustrated in FIG. 26, portions of annular shapes of respective ferrite cores 49a, 49b, and 49c may be separated from one another by a common connection 51. The connection 51 is a member configured by integrating functions of the connections 47a, 47b, and 47c of the third modified example. As illustrated in FIG. 27, in the assembling process of the magnetic material 42e, the wires 3a, 3b, and 3c are wound around the ferrite cores 49a, 49b, and 49c in a state in which the connection 51 is separated from the respective ferrite cores 49a, 49b, and 49c. In this instance, the portions of the annular shapes of the ferrite cores 49a, 49b, and 49c (connection 51) are missing, and thus the wires 3a, 3b, and 3c can be inserted into hole portions of the ferrite cores 49a, 49b, and 49c from the missing places. Thus, the wires 3a, 3b, and 3c can be easily wound around the ferrite cores 49a, 49b, and 49c. When winding of the wires 3a, 3b, and 3c finishes, as illustrated in FIG. 28, the connection 51 is slid and engaged with the ferrite cores 49a, 49b, and 49c, and the respective ferrite cores 49a, 49b, and 49c are assembled into an integrated magnetic material 42e. In this way, the magnetic material 42e of the fourth modified example has a structure allowing the plurality of ferrite cores 49a, 49b, and 49c to be connected (joined) to one another, and thus may not have another component for bundling the plurality of ferrite cores 49a, 49b, and 49c. Thus, it is possible to reduce costs and the number of parts. In addition, the plurality of ferrite cores 49a, 49b, and 49c can be arranged in an integrated manner, and thus it is possible to achieve space saving and miniaturization.

Embodiments of the present invention have been described. However, the embodiments are presented as examples, and are not intended to restrict the scope of the present invention. The embodiments may be implemented in various other forms, and may be omitted, replaced, and changed in various manners within a range of a subject matter of the present invention. The embodiments and changed forms thereof are included in the scope and the subject matter of the present invention and are included in the present invention described in the claims and equivalents thereof.

In the above embodiments, the inverter 50 and the motor 60 are given as examples of two elements to which the wire harness 1 according to the embodiments are connected. However, the wire harness 1 may be applied to between two other elements when a surge voltage may be generated between the two elements.

In addition, the above embodiments give an example of a configuration in which the wire harness 1 according to the embodiments are used as power supply lines for connecting the inverter 50 and the motor 60 corresponding to the three-phase AC type. However, the inverter 50 and the motor 60 may correspond to other types than the three-phase AC type. That is, for example, the wire harness 1 according to the embodiments may correspond to four-phase wiring rather than three-phase wiring, and each of the wire portion 2 may have three or more wires.

Further, in the above embodiments, the braided wire 6 are given as examples of the shield member that suppresses noise. However, for example, a metal tape or foil of copper, aluminum, and the like may be applied to the shield member, and the shield member may be configured by combining the metal tape or foil with the braided wire 6.

In addition, respective wires of the wire portion 2 may correspond to a coaxial cable. That is, it is possible to employ a configuration in which a shield member is separately provided for each wire around a conductor of each wire and between the conductor and a coated portion. Further, respective wires of the wire portion 2 may be extended in the same direction along the central axial line X1 and may not be evenly disposed along the circumferential direction around the central axial line X1 unlike the above embodiment.

Furthermore, the above embodiments give an example of a configuration in which the braided wire 6 serving as the shield member are grounded. However, the braided wire 6 may not be grounded.

A wire harness according to the present invention can achieve a proper decreasing amount of a surge voltage by appropriately combining and using a plurality of surge reducing means, and thus have an effect of suitably suppressing the surge voltage.

Although the present invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A wire harness comprising:
 a wire portion having three or more wires arranged in a same direction;
 connectors connected to end portions of the wire portion;

a wire-side surge reducing section provided in the wire portion to reduce a surge voltage;
a connector-side surge reducing section provided in each of the connectors to reduce the surge voltage;
a middle portion installed in an intermediate position of the wire portion between the connectors; and
a middle portion-side surge reducing section provided in the middle portion to reduce the surge voltage.

2. A wire harness comprising:
a wire portion having three or more wires arranged in a same direction;
connectors connected to end portions of the wire portion; and
a middle portion installed in an intermediate position of the wire portion between the connectors, wherein
the wire harness includes any one of:
a group of a wire-side surge reducing sections provided in the wire portion to reduce a surge voltage and a middle portion-side surge reducing section provided in the middle portion to reduce the surge voltage; and
a group of a connector-side surge reducing sections provided in each of the connectors to reduce the surge voltage and the middle portion-side surge reducing section.

3. The wire harness according to claim 1, further comprising:
a shield member collectively surrounding an outer circumferential side of the wire portion, wherein
the wire-side surge reducing section includes a first wire holding member maintaining arrangement of the wires around a central axial line of the wire portion,
each of the wires of the wire portion includes a conductor and an insulator coating an outer circumference of the conductor, and
the first wire holding member includes:
an external form maintaining portion surrounding a further outer circumferential side of the wire portion and the shield member; and
a plurality of shield member form correcting portions formed such that each of the shield member form correcting portions projects from an inner circumferential surface of the external form maintaining portion in a direction of the central axial line between two wires of the wire portion adjacent to each other along a circumferential direction around the central axial line, and the shield member approaches a side of the central axial line from an outer circumferential-side tangent connecting the conductors of the two wires on a cross section viewed from an axial direction along the central axial line.

4. The wire harness according to claim 1, further comprising:
a shield member collectively surrounding an outer circumferential side of the wire portion, wherein
the wire-side surge reducing section includes a first wire holding member maintaining arrangement of the wires around a central axial line of the wire portion,
each of the wires of the wire portion includes a conductor and an insulator coating an outer circumference of the conductor, and
the first wire holding member includes:
an external form maintaining portion surrounding a further outer circumferential side of the wire portion and the shield member; and
a plurality of shield member form correcting portions formed such that each of the shield member form correcting portions projects from an inner circumferential surface of the external form maintaining portion in a direction of the central axial line between two wires of the wire portion adjacent to each other along a circumferential direction around the central axial line, and the shield member approaches a side of the central axial line from an outer circumferential-side tangent connecting the conductors of the two wires on a cross section viewed from an axial direction along the central axial line.

5. The wire harness according to claim 2, further comprising:
a shield member collectively surrounding an outer circumferential side of the wire portion, wherein
the wire-side surge reducing section includes a first wire holding member maintaining arrangement of the wires around a central axial line of the wire portion,
each of the wires of the wire portion includes a conductor and an insulator coating an outer circumference of the conductor, and
the first wire holding member includes:
an external form maintaining portion surrounding a further outer circumferential side of the wire portion and the shield member; and
a plurality of shield member form correcting portions formed such that each of the shield member form correcting portions projects from an inner circumferential surface of the external form maintaining portion in a direction of the central axial line between two wires of the wire portion adjacent to each other along a circumferential direction around the central axial line, and the shield member approaches a side of the central axial line from an outer circumferential-side tangent connecting the conductors of the two wires on a cross section viewed from an axial direction along the central axial line.

6. The wire harness according to claim 3, wherein
the wires of the wire portion have circular shapes on the cross section and are disposed at equal intervals along the circumferential direction, and
the shield member form correcting portions of the first wire holding member are formed such that the shield member approaches the side of the central axial line from a segment connecting center of gravity points of two wires of the wire portion adjacent to each other in the circumferential direction between the two wires on the cross section.

7. The wire harness according to claim 4, wherein
the shield member form correcting portions of the first wire holding member are formed such that the shield member approaches up to the central axial line from between the two wires on the cross section to surround respective outer circumferential sides of the wires of the wire portion.

8. The wire harness according to claim 3, wherein
the shield member is grounded.

9. The wire harness according to claim 6, wherein
the shield member is grounded.

10. The wire harness according to claim 7, wherein
the shield member is grounded.

11. The wire harness according to claim 1, wherein
the wire-side surge reducing section includes a second wire holding member maintaining arrangement around the central axial line of the respective wires of the wire portion, and
the second wire holding member includes:
a main body portion formed in a cylindrical shape using the central axial line as an axial center;

a plurality of wire housing portions provided to separately penetrate the main body portion along the central axial line, formed to be able to separately accommodate the wires, and disposed at equal intervals along the circumferential direction around the central axial line on the cross section viewed from the axial direction along the central axial line; and a space portion formed to penetrate the main body portion along the central axial line between two wire housing portions adjacent to each other along the circumferential direction among the plurality of wire housing portions.

12. The wire harness according to claim 1, wherein the wire-side surge reducing section includes a second wire holding member maintaining arrangement around the central axial line of the respective wires of the wire portion, and the second wire holding member includes:

a main body portion formed in a cylindrical shape using the central axial line as an axial center;

a plurality of wire housing portions provided to separately penetrate the main body portion along the central axial line, formed to be able to separately accommodate the wires, and disposed at equal intervals along the circumferential direction around the central axial line on the cross section viewed from the axial direction along the central axial line; and a space portion formed to penetrate the main body portion along the central axial line between two wire housing portions adjacent to each other along the circumferential direction among the plurality of wire housing portions.

13. The wire harness according to claim 2, wherein the wire-side surge reducing section includes a second wire holding member maintaining arrangement around the central axial line of the respective wires of the wire portion, and the second wire holding member includes:

a main body portion formed in a cylindrical shape using the central axial line as an axial center;

a plurality of wire housing portions provided to separately penetrate the main body portion along the central axial line, formed to be able to separately accommodate the wires, and disposed at equal intervals along the circumferential direction around the central axial line on the cross section viewed from the axial direction along the central axial line; and a space portion formed to penetrate the main body portion along the central axial line between two wire housing portions adjacent to each other along the circumferential direction among the plurality of wire housing portions.

14. The wire harness according to claim 11, wherein the wire housing portions of the second wire holding member are formed such that a visible outline of the wires accommodated in the wire housing portions at least touches a visible outline of the cylindrical shape of the main body portion from an inner circumference side on the cross section.

15. The wire harness according to claim 11, wherein the space portion of the second wire holding member is formed in an integrated manner from between two wire housing portions adjacent to each other along the circumferential direction among the plurality of wire housing portions up to the central axial line on the cross section.

16. The wire harness according to claim 1, wherein the connector-side surge reducing section includes a magnetic material formed in an annular shape inside a case of each of the connectors accommodating the wire portion therein, and is installed to surround outer circumferential sides of the three or more wires of the wire portion or a plurality of conductors connected to the three or more wires, respectively.

17. The wire harness according to claim 1, wherein the middle portion-side surge reducing section includes a magnetic material formed in an annular shape inside a casing of the middle portion accommodating the wire portion therein, and is installed to surround outer circumferential sides of the three or more wires of the wire portion or a plurality of conductors connected to the three or more wires, respectively.

18. The wire harness according to claim 17, wherein the magnetic material is separately installed in each of the three or more wires or the plurality of conductors.

19. The wire harness according to claim 16, wherein the magnetic material is installed to collectively surround outer circumferential sides in which the three or more wires or the plurality of conductors are arranged.

* * * * *